United States Patent
Zhao et al.

(10) Patent No.: US 11,615,308 B2
(45) Date of Patent: **\*Mar. 28, 2023**

(54) GENERATING RESPONSES TO QUERIES ABOUT VIDEOS UTILIZING A MULTI-MODAL NEURAL NETWORK WITH ATTENTION

(71) Applicant: Adobe Inc., San Jose, CA (US)

(72) Inventors: Wentian Zhao, San Jose, CA (US); Seokhwan Kim, San Jose, CA (US); Ning Xu, Milpitas, CA (US); Hailin Jin, San Jose, CA (US)

(73) Assignee: Adobe Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/563,901

(22) Filed: Dec. 28, 2021

(65) Prior Publication Data

US 2022/0122357 A1   Apr. 21, 2022

Related U.S. Application Data

(63) Continuation of application No. 16/784,005, filed on Feb. 6, 2020, now Pat. No. 11,244,167.

(51) Int. Cl.
*G06K 9/00* (2022.01)
*G06N 3/02* (2006.01)
(Continued)

(52) U.S. Cl.
CPC ............... *G06N 3/08* (2013.01); *G06F 17/16* (2013.01); *G06N 3/02* (2013.01); *G06V 10/82* (2022.01);
(Continued)

(58) Field of Classification Search
CPC ............ G06K 9/00718; G06K 9/00765; G06F 17/16; G06N 3/02
See application file for complete search history.

(56) References Cited

U.S. PATENT DOCUMENTS 11,244,167 B2 *   2/2022   Zhao .................... G06N 3/08
2019/0034793 A1 *   1/2019   Kataria ............. G06N 3/0454
(Continued)

OTHER PUBLICATIONS

Alayrac, J.; Bojanowski, P.; Agrawal, N.; Sivic, J.; Laptev, I.; and Lacoste-Julien, S. 2016b. Unsupervised learning from narrated instruction videos. In IEEE CVPR, 4575-4583.
(Continued)

*Primary Examiner* — David F Dunphy
(74) *Attorney, Agent, or Firm* — Keller Preece PLLC

(57) ABSTRACT

The present disclosure relates to systems, methods, and non-transitory computer-readable media for generating a response to a question received from a user during display or playback of a video segment by utilizing a query-response-neural network. The disclosed systems can extract a query vector from a question corresponding to the video segment using the query-response-neural network. The disclosed systems further generate context vectors representing both visual cues and transcript cues corresponding to the video segment using context encoders or other layers from the query-response-neural network. By utilizing additional layers from the query-response-neural network, the disclosed systems generate (i) a query-context vector based on the query vector and the context vectors, and (ii) candidate-response vectors representing candidate responses to the question from a domain-knowledge base or other source. To respond to a user's question, the disclosed systems further select a response from the candidate responses based on a comparison of the query-context vector and the candidate-response vectors.

20 Claims, 17 Drawing Sheets

(51) Int. Cl.
  *G06F 17/16* (2006.01)
  *G06N 3/08* (2023.01)
  *G06V 20/40* (2022.01)
  *G06V 30/18* (2022.01)
  *G06V 30/19* (2022.01)
  *G06V 10/82* (2022.01)
  *G06V 20/62* (2022.01)
  *G06V 30/10* (2022.01)

(52) U.S. Cl.
  CPC .............. *G06V 20/41* (2022.01); *G06V 20/49* (2022.01); *G06V 20/62* (2022.01); *G06V 30/18057* (2022.01); *G06V 30/19173* (2022.01); *G06V 30/10* (2022.01)

(56) References Cited

U.S. PATENT DOCUMENTS

| | | | |
|---|---|---|---|
| 2020/0139973 A1* | 5/2020 | Palanisamy | G08G 1/167 |
| 2021/0064648 A1 | 3/2021 | Farri et al. | |
| 2021/0133461 A1 | 5/2021 | Ren et al. | |

OTHER PUBLICATIONS

Berant, J.; Chou, A.; Frostig, R.; and Liang, P. 2013. Semantic parsing on freebase from question-answer pairs. In Proceedings of the EMNLP, 1533-1544.

Bojanowski, P.; Grave, E.; Joulin, A.; and Mikolov, T. 2017. Enriching word vectors with subword information. Trans-actions of the Association for Computational Linguistics 5:135-146.

Feng, M.; Xiang, B.; Glass, M. R.; Wang, L.; and Zhou, B. 2015. Applying deep learning to answer selection: A study and an open task. In 2015 IEEE ASRU, 813-820. IEEE.

He, K.; Zhang, X.; Ren, S.; and Sun, J. 2016. Deep residual learning for image recognition. In Proceedings of the IEEE CVPR, 770-778.

Heilman, M., and Smith, N. A. 2010. Good question! statistical ranking for question generation. In NAACL-HLT, 609-617.

Huang, D.-A.; Lim, J. J.; Fei-Fei, L.; and Carlos Niebles, J. 2017. Unsupervised visual-linguistic reference resolution in instructional videos. In Proceedings of the IEEE CVPR, 2183-2192.

Huang, D.-A.; Buch, S.; Dery, L.; Garg, A.; Fei-Fei, L.; and Carlos Niebles, J. 2018. Finding "it": Weakly-supervised reference-aware visual grounding in instructional videos. In The IEEE CVPR, 5948-5957.

Jang, Y.; Song, Y.; Yu, Y.; Kim, Y.; and Kim, G. 2017. Tgifqa: Toward spatio-temporal reasoning in visual question answering. In Proceedings of the IEEE CVPR, 2758-2766.

Kang, G.-C.; Lim, J.; and Zhang, B.-T. 2019. Dual attention networks for visual reference resolution in visual dialog. arXiv preprint arXiv:1902.09368.

Kim, K.-M.; Heo, M.-O.; Choi, S.-H.; and Zhang, B.-T. 2017. Deepstory: video story qa by deep embedded memory networks. In Proceedings of the IJCAI, 2016-2022.

Kim, Y. 2014. Convolutional neural networks for sentence classification. In Proceedings of the EMNLP, 1746-1751.

Kingma, D. P., and Ba, J. 2014. Adam: A method for stochastic optimization. CoRR abs/1412.6980.

Kuehne, H.; Arslan, A. B.; and Serre, T. 2014. The language of actions: Recovering the syntax and semantics of goal-directed human activities. In IEEE CVPR, 780-787.

Lei, J.; Yu, L.; Bansal, M.; and Berg, T. 2018. Tvqa: Localized, compositional video question answering. In Proceedings of the EMNLP, 1369-1379.

Malmaud, J.; Huang, J.; Rathod, V.; Johnston, N.; Rabinovich, A.; and Murphy, K. 2015. Whats cookin? interpreting cooking videos using text, speech and vision. In Proceedings of the NAACL-HLT, 143-152.

Mikolov, T.; Sutskever, I.; Chen, K.; Corrado, G. S.; and Dean, J. 2013. Distributed representations of words and phrases and their compositionality. In Advances in neural information processing systems, 3111-3119.

Perozzi, B.; Al-Rfou, R.; and Skiena, S. 2014. Deepwalk: Online learning of social representations. In Proceedings of the 20th ACM SIGKDD international conference on Knowledge discovery and data mining, 701-710.

Povey, D.; Ghoshal, A.; and Boulianne, G. 2011. The kaldi speech recognition toolkit. In IEEE 2011 Workshop on Automatic Speech Recognition and Understanding (ASRU).

Rajpurkar, P.; Zhang, J.; Lopyrev, K.; and Liang, P. 2016. Squad: 100,000+ questions for machine comprehension of text. In Proceedings of the 2016 Conference on Empirical Methods in Natural Language Processing, 2383-2392.

Rajpurkar, P.; Jia, R.; and Liang, P. 2018. Know what you dont know: Unanswerable questions for squad. In Proceedings of the ACL, 784-789.

Redmon, J.; Divvala, S.; Girshick, R.; and Farhadi, A. 2016. You only look once: Unified, real-time object detection. In Proceedings of the IEEE CVPR, 779-788.

Sener, O.; Zamir, A. R.; Savarese, S.; and Saxena, A. 2015. Unsupervised semantic parsing of video collections. In Proceedings of the IEEE CVPR, 4480-4488.

Tapaswi, M.; Zhu, Y.; Stiefelhagen, R.; Torralba, A.; Urta-sun, R.; and Fidler, S. 2016. Movieqa: Understanding stories in movies through question-answering. In Proceedings of the IEEE CVPR, 4631-4640.

Unger, C.; Freitas, A.; and Cimiano, P. 2014. An introduction to question answering over linked data. In Reasoning Web International Summer School, 100-140. Springer.

Wang, S.; Zhao, W.; Kou, Z.; and Xu, C. 2018. How to make a bit sandwich? learning to reason towards understanding web instructional videos. arXiv preprint arXiv:1812.00344.

Wang, M.; Smith, N. A.; and Mitamura, T. 2007. What is the jeopardy model? a quasi-synchronous grammar for qa. In Proceedings of the EMNLP-CoNLL, 22-32.

Xue, H.; Zhao, Z.; and Cai, D. 2017. Unifying the video and question attentions for open-ended video question an-swering. IEEE Trans. Image Processing 26(12):5656-5666.

Yang, Y.; Yih, W.-t.; and Meek, C. 2015. Wikiqa: A challenge dataset for open-domain question answering. In Pro-ceedings of the EMNLP, 2013-2018.

Ye, Y.; Zhao, Z.; Li, Y.; Chen, L.; Xiao, J.; and Zhuang, Y. 2017. Video question answering via attribute-augmented attention network learning. In Proceedings of the 40th International ACM SIGIR Conference on Research and Development in Information Retrieval, 829-832.

Yu, S.-I.; Jiang, L.; and Hauptmann, A. 2014. Instructional videos for unsupervised harvesting and Tearning of action examples. In Proceedings of the 22nd ACM international conference on Multimedia, 825-828.

Zeng, K.; Chen, T.; Chuang, C.; Liao, Y.; Niebles, J. C.; and Sun, M. 2017. Leveraging video descriptions to learn video question answering. In Proceedings of the AAAI, 4334-4340.

Zhao, Z.; Yang, Q.; Cai, D.; He, X.; and Zhuang, Y. 2017. Video question answering via hierarchical spatio-temporal attention networks. In Proceedings of the Twenty-Sixth International Joint Conference on Artificial Intelligence, IJCAI 2017, Melbourne, Australia, Aug. 19-25, 2017, 3518-3524.

Zhou, L.; Zhou, Y.; Corso, J. J.; Socher, R.; and Xiong, C. 2018a. End-to-end dense video captioning with masked transformer. In Proceedings of the IEEE CVPR, 8739-8748.

Zhou, L.; Xu, C.; and Corso, J. J. 2018. Towards automatic learning of procedures from web instructional videos. In Proceedings of the Thirty-Second AAAI Conference on Artificial Intelligence, (AAAI-18), the 30th innovative Applications of Artificial Intelligence (IAAI-18), and the 8th AAAI Symposium on Educational Advances in Artificial Intelli-gence (EAAI-18), New Orleans, Louisiana, USA, Feb. 2-7, 2018, 7590-7598.

Jeffrey Pennington, Richard Socher, and Christopher, D. Manning, Glove: Global Vectors for Word Representation, In EMNLP, 2014.

(56) References Cited

OTHER PUBLICATIONS

Kyunghyun Cho, Bart van Merrienboer, Caglar Gulcehre, Dzmitry Bahdanau, Fethi Bougares, Holger Schwenk, Yoshua Bengio, Learning Phrase Representations Using RNN Encoder-Decoder For Statistical Machine Translation, In EMNLP, 2014.

Colas et al, "TutorialVQA: Question Answering Dataset for Tutorial Videos", 2019, inarXiv:1912.01046V1, 6 Pages (Year: 2019).

U.S. Appl. No. 16/784,005, Oct. 7, 2021, Notice of Allowance.

\* cited by examiner

GENERATING RESPONSES TO QUERIES ABOUT VIDEOS UTILIZING A MULTI-MODAL NEURAL NETWORK WITH ATTENTION

CROSS-REFERENCE TO RELATED APPLICATIONS

The present application is a continuation of U.S. application Ser. No. 16/784,005, filed on Feb. 6, 2020. The aforementioned application is hereby incorporated by reference in its entirety.

BACKGROUND

As social media and online resources have proliferated, computing devices increasingly stream or access instructional videos for do-it-yourself projects and self-help tutorials. With the advent of online streaming services, among other digital platforms, video is rapidly replacing text, images, or other static mediums for instructional content. Instructional videos have overtaken such static mediums because video can offer simultaneous audio and visual communication and step-by-step instruction that many users find helpful in understanding how to perform a given task. Unfortunately, conventional video systems that present or facilitate viewing instructional videos include several technical limitations. For instance, some conventional video systems require extensive captioning, suffer from decreased response accuracy, or demonstrate lower quality of responses.

In particular, some conventional video systems utilize a method of dense-video captioning that requires text descriptions for all events (e.g., visual events) in a video. The method involves both detecting events and describing the events as occurring within the video. To detect and describe such events, some conventional video systems segment the video with different anchors to form system-proposed events. But such conventional video systems utilizing dense-video captioning have difficulty capturing or recognizing long-term dependencies between these system-proposed events, thereby missing the relevance between such events. Such conventional video systems also struggle with training intelligent models like recurrent neural networks to accurately represent video content within a system-proposed event.

As mentioned above, some conventional video systems also tend to generate inaccurate responses to questions concerning a video based on textual analysis. In particular, some conventional video systems apply natural langue processing to a question concerning a video to provide a response. For many questions, a question transcribed by the natural language processing does not contain sufficient information to appropriately or accurately answer the question. For instance, suppose a mechanic is watching an instructional video that illustrates how to assemble cylinders and heads on an engine, and asks "What's the proper torque?" The appropriate answer to this question cannot be determined from the question itself because the answer is likely different during different steps of the engine assembly. For example, an answer of 65 ft-lbs may be appropriate for a first part of the engine assembly, but inappropriate for a subsequent part of the engine assembly. Accordingly, conventional video systems that rely extensively on natural language processing often provide inaccurate responses to questions.

Conventional video systems further suffer from lower quality of responses to questions. In particular, some conventional video systems employ automated or crowdsourcing means to generate question-answer pairs for training system models. This approach decreases a response quality. For example, in crowdsourcing answer data sets, crowdsources utilize publicly-available videos to obtain a predefined pool of answers for use in providing answers to questions. But such answer-data sets diminish the quality, clarity, and applicability of answers that conventional video systems provide based on users' questions. In particular, an external knowledge base generated with crowdsourced answers can lead conventional video systems to provide answers that use ambiguous or inconsistent terminology. These problems make many conventional video systems less useful and user-friendly.

SUMMARY

This disclosure describes one or more embodiments of systems, non-transitory computer-readable media, and methods that solve the foregoing problems in addition to other benefits. In particular, the disclosed systems analyze visual features of a video segment to generate a response to a question received from a user during display or playback of the video segment. In some embodiments, for instance, the disclosed systems extract a query vector from a question corresponding to a video segment. The disclosed systems further generate visual-context vectors representing visual cues and textual-context vectors representing transcript cues corresponding to the video segment by using context encoders or other layers from a query-response-neural network. In so doing, the disclosed systems generate (i) a query-context vector by combining the query vector, the visual-context vectors, and the textual-context vectors, and (ii) candidate-response vectors representing candidate responses to the question from a domain-knowledge base or other source. To respond to a user's question, the disclosed system further selects a response from the candidate responses based on a comparison of the query-context vector and the candidate-response vectors.

BRIEF DESCRIPTION OF THE DRAWINGS

The detailed description provides one or more embodiments with additional specificity and detail through the use of the accompanying drawings, as briefly described below.

DETAILED DESCRIPTION

Figure 1:
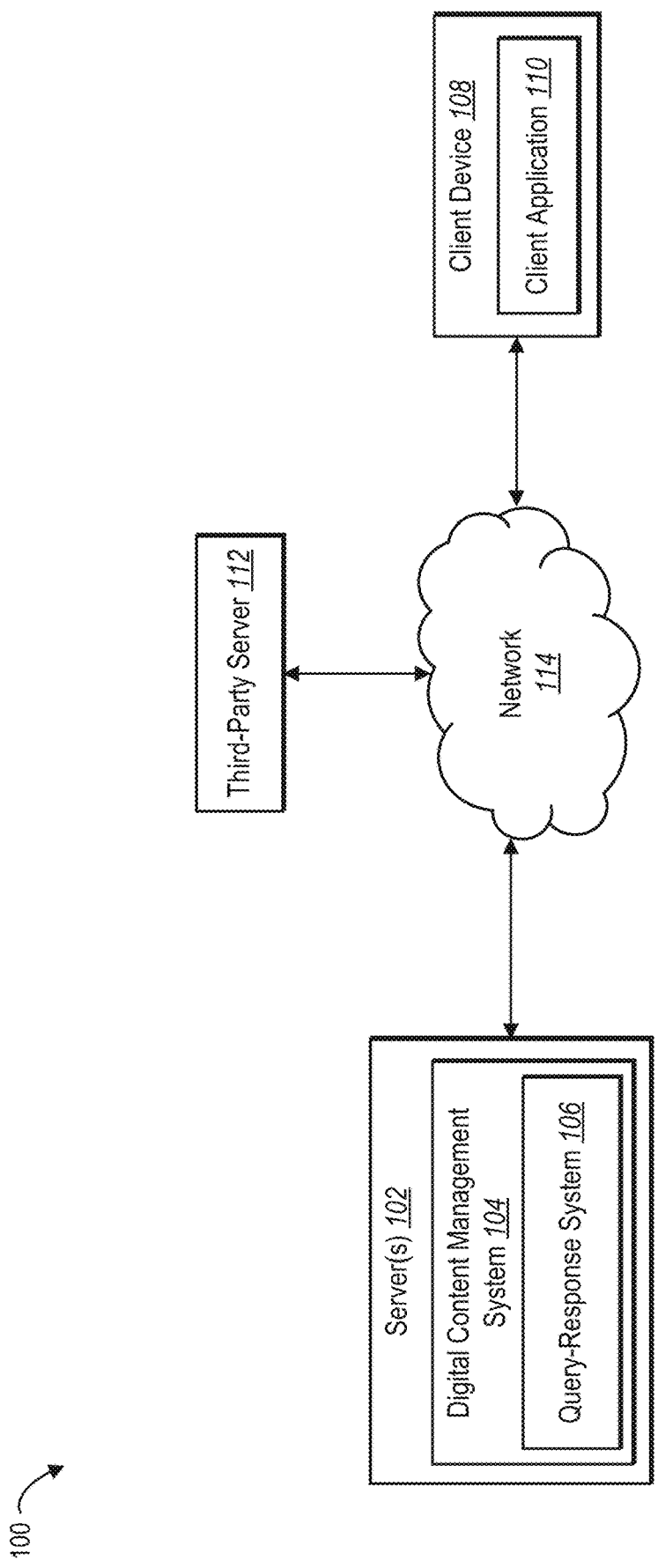
FIG. 1 illustrates a diagram of a query-response system in accordance with one or more embodiments.

This disclosure describes one or more embodiments of a query-response system that utilizes a query-response-neural network for contextualizing and responding to a user question received during display or playback of a video segment, such as a screencast-tutorial segment. The query-response-neural network can include neural-network layers and mechanisms for generating representations of questions, transcript text, visual cues, and answer candidates. By analyzing both audio and visual cues with such a query-response-neural network, the disclosed query-response system provides answers to users' questions with accuracy and multiple contextual modes for questions.

For instance, in some embodiments, the query-response system extracts a query vector from a transcribed or written question by a user corresponding to a video segment. The query-response system further captures multiple contextual modalities for the question by generating visual-context vectors for visual features and textual-context vectors for transcript text corresponding to the video segment. To do so, the query-response system may utilize a query-response-neural network comprising a visual-cue encoder and a transcript encoder that detect and recognize visual cues from software-user-interface components (e.g., software-user-interface panels, software-user-interface pop-up dialogues, software-user-interface tools) in the video segment and transcript cues from a transcript of the video segment, respectively.

By further using a recurrent-neural-network units or attention mechanisms from the query-response-neural network, the query-response system generates a query-context vector based on the query vector and the context vectors. The query-response system subsequently generates candidate-response vectors representing candidate responses to the question utilizing response-network layers from the query-response-neural network. Such candidate responses may come from a domain-knowledge base or other source. To respond to a user's question, the disclosed system further selects a response from the candidate responses based on a similarity comparison of (and match between) the query-context vector and the candidate-response vectors.

As mentioned above, the query-response system can utilize various network layers of a query-response-neural network to select a response to a user question received during playback of a video segment. In question-network layers of the query-response-neural network, for instance, the query-response system can apply an encoder to analyze and represent features of the question. In some cases, the query-response system extracts a query vector from a transcribed or written version of the question as a vector representation of the question. To do so, the query-response system may convert the question from uttered speech to digital text (e.g., via a speech-to-text mechanism) or receive an electronic message from a client device. Based on the digital text of the question, the question-network layers can transform the question into one or more word embeddings or other formats as query vectors.

In addition to the question-network layer, the query-response system can determine an audio or visual context for the question by utilizing context-network layers in the query-response-neural network. In particular, the context-network layers can provide multiple contextual modalities for the question, including visual context and textual context corresponding to the video segment. In some embodiments, the query-response system identifies the visual context and the textual context by (i) utilizing visual-feature layers of the context-network layers to generate visual-context vectors representing visual features corresponding to a video segment and (ii) transcript layers of the context-network layers to generate textual-context vectors representing transcript test corresponding to the video segment.

By using the visual-feature layers, in some cases, the query-response system can detect graphical objects within a video segment. Such graphical objects may include software tools, software panels, software pop-up dialogues, or other software-user-interface components shown in a graphical user interface. Additionally, in some embodiments, the query-response system represents inner objects corresponding to detected graphical objects as visual-context vectors and uses the vectors in determining a response to a user's question.

Based on synthetic training data, for instance, the query-response system utilizes a detection neural network to detect panels and pop-up dialogues from one or more frames in a video segment. To train the detection neural network to perform such detection, the query-response system generates synthetic-training images based on various combinations of a background image (e.g., a random background image) and a graphical object (e.g., a software-user-interface component). In turn, the query-response system can compare predicted-graphical objects with synthetic-ground-truth objects and update the detection neural network based on the comparison. Once trained, in some embodiments, the query-response system can detect graphical objects comprising panels and pop-up dialogues by utilizing the detection neural network. The query-response system can then perform acts and algorithms disclosed herein to determine what kind of panel or pop-up dialogue is detected.

For example, in certain implementations, the query-response system can utilize a graphical-object-matching engine to recognize particular objects (e.g., inner-graphical objects) from a detected outer-graphical object. In some cases, the query-response system can utilize a matching algorithm to determine similarity scores between vector representations of the inner-graphical objects from outlined-graphical objects, such as a panel or pop-up dialogue, and vector representations of objects predetermined as associated with certain visual-feature categories. Based on the similarity scores, the query-response system can generate corresponding visual-context vectors that indicate one or more visual-feature categories for the detected objects, such as pop-up dialogue(s) or panel(s).

Additionally or alternatively, the query-response system can use a tool-recognition classifier to identify a software tool in a given frame of a video segment. In turn, the query-response system generates a specific visual-context vector that indicates one or more visual-feature categories for the detected objects, whether pop-up dialogues, panels, tools, etc. Such visual-context vectors represent one mode of context for determining a response to a user question.

With respect to the textual context, the query-response system can utilize the transcript layers to generate textual-context vectors representing the transcript for corresponding frames in the video segment. To do so, the query-response system may initially convert spoken word in each of the frames of the video segment to digital text (e.g., via a speech-to-text mechanism) in the event a transcript for the video segment is not available. With the digital text of the transcript, the transcript layers can then transform the transcript into word embeddings and perform various operations such as convolution and max pooling to generate textual-context vectors corresponding to the video segment.

In addition to the question-network layers and the context-network layers, the query-response system can utilize posterior layers to analyze a query vector and corresponding context vectors. For instance, in some cases, the query-response system uses a recurrent neural network ("RNN") to analyze one or both of visual-context vectors and textual-context vectors. In some implementations, RNN layers comprise bi-directional recurrent layers of one or more gated recurrent units ("GRUs"). By using GRUs or other RNN layers, the query-response system can capture visual cues or transcript cues from different frames of a video segment.

In addition to RNN layers, in some cases, the query-response system further uses attention mechanisms to determine one or both of temporal features and spatial features of a video segment from visual-context vectors and textual-context vectors. By utilizing attention mechanisms, the query-response system can intelligently weight corresponding aspects of the context vectors to indicate more important or less important features. At the same time, the attention mechanisms can selectively discount other temporal or spatial aspects of the context vectors. The query-response system can accordingly use attention mechanisms to weight spatial or temporal features of a video segment to more accurately respond to a user's question received during playback of the video segment.

In some implementations, the query-response system uses a temporal-attention mechanism, a spatial-attention mechanism, or both mechanisms as a dual-attention mechanism. For example, the query-response system can (i) pass a query vector and visual-context vectors through a spatial-attention mechanism to generate a precursor query-context vector and (ii) and textual-context vector and a corresponding query vector through RNN layers to generate a query-context vector. When utilizing a dual mechanism, for instance, the query-response system can (i) pass the query vector and a hidden-feature representation of transcript text through the temporal-attention mechanism to generate a precursor query-context vector and (ii) pass the precursor vector and visual-context vectors through a spatial-attention mechanism to generate a query-context vector.

After modifying and integrating the query vector and the context vectors using posterior layers of the query-response-neural network, the query-response system can combine (e.g., concatenate) the query and context vectors to generate a query-context vector. As noted above, the query-response system can compare such a query-context vector with candidate-response vectors to determine a response to a user's question. In particular, the query-response system utilizes response-network layers of the query-response-neural network to generate the candidate-response vectors for such a comparison with the query-context vector. For example, in some cases, the response-network layers converts external domain knowledge from knowledgeable users (e.g., professional artists) into a graph structure based upon which the query-response system fine-tunes the candidate-response vectors. The graph structure represents links between candidate responses and visual features of the external domain knowledge. Using this graph structure, the query-response system can impart the external domain knowledge to the candidate-response vectors generated at the response-network layer.

To select a response to the user's question from candidate responses, in some embodiments, the query-response system applies a matching function to the candidate-response vectors and the query-context vector. In some embodiments, the query-response system generates a matching score for each query-response pairing between a query-context vector with a respective candidate-response. In turn, the query-response system can select a response to the question based on a particular query-response pairing having a matching score that satisfies a threshold matching score. As described below, the query-response system may generate matching scores represented as matching probabilities (e.g., as output from fully-connected layers and/or a softmax function), cosine similarity values, or Euclidean distances. Upon selecting a response, the query-response system can provide an audio reproduction of the identified response or provide, for display within a user interface of a client device, the identified response to the question.

In improvements to the conventional systems described above, some state-of-the-art systems use neural networks to analyze text from a video to answer a question during playback of a video, such as the system described by Seokhwan Kim, Answering Questions During Video Playback, U.S. application Ser. No. 16/510,491 (filed Jul. 12, 2019) (hereinafter "Kim"), the entire contents of which are hereby incorporated by reference. But Kim's system uses a neural-network architecture that does not analyze visual features from a video to interpret a question with respect to a video. Because Kim's network does not analyze such visual features from a video, the system cannot rely on visual cues from a video to select answers to questions.

As suggested by the foregoing, the query-response system provides several technical advantages over other systems. For example, the query-response system introduces a flexible neural network that captures multiple contextual modalities without having to caption visual events occurring within a video unlike other systems. To illustrate, the query-response-neural network architecture of the query-response system increases the amount and format of data representing context for answering a question during a video. In particular, the query-response system analyzes both visual features (e.g., uncaptioned visual context) corresponding to a particular video segment and textual features (e.g., textual context) for the video segment and the question itself. By applying context-network layers to generate context vectors representing both visual features and transcript text, the query-response system can account for visual information shown in the video segment and auditory information spoken during such a video segment. When the textual context does not sufficiently account for such visual information, the query-response system uses a neural network that captures another mode of visual information. Further, as disclosed herein, in some embodiments, the query-response system uses a recurrent neural network to provide relational dependencies between portions of the video, unlike some systems described above.

Due in part to the flexibility of the query-response-neural network, the query-response system can generate more accurate responses to questions received during playback of a video in comparison to other systems. By accounting for both textual context and visual context when responding to questions associated with video segments, the query-response system can provide responses with increased clarity, applicability, relevance, and/or correctness in comparison to other systems, such as conventional systems relying on natural language processing to interpret a question. For example, unlike other systems, the query-response system can accurately respond to a question about content visibly depicted in a video segment, even though the narration during the video segment corresponds to some other content or another topic. Similarly, unlike conventional video systems, the query-response system can accurately respond to a question having a subject or predicate that depends on the visual context (e.g., "Is there a shortcut for that?"). In this manner, the query-response system can provide increased accuracy to responses to questions received during playback of a video segment.

As a further technical advantage, in some embodiments, the query-response system utilizes a specific external knowledge base to fine-tune or select from candidate responses to a user's question. Where conventional video systems may lower response quality by automatically generating question-answer pairs or crowdsourcing publicly-available videos to obtain a predefined pool of answers, the query-response system utilizes a different approach that increases response quality. For example, in some cases, the query-response system utilizes external domain knowledge from knowledgeable users (e.g., professional/expert artists). As mentioned above, the query-response system utilizes response-network layers comprising learned weights for fine-tuning candidate-response vectors based on a graph structure associated with visual features or entities of the external domain knowledge. In so doing, the query-response system can transfer external domain knowledge to the candidate-response vectors to increase a quality, clarity, and applicability of responses to questions received during display or playback of a video. By using the external domain knowledge to fine-tune candidate-response vectors, for example, the query-response system can eliminate or at least reduce an amount of responses that are conflicting, ambiguous, or inconsistent in terminology. Such an approach therefore improves the quality of responses.

As illustrated by the foregoing discussion, the present disclosure utilizes a variety of terms to describe features and benefits of the query-response system. For example, as used herein, the term "video segment" refers to a group of video frames from a digital video. In particular, a video segment can include a set of video frames that corresponds to a particular portion of a video. Such video frames may correspond to a time before, during, and/or after the query-response system receives a question from a user regarding the video. In some embodiments, a video segment can include prerecorded portions of a screencast tutorial video, narrated instructional video, do-it-yourself video, cooking video, among myriad other types of videos.

As also used herein, the term "question" refers to a query or request related in time or other aspect to a video segment. In particular, the question can include a query received at the query-response system during display or playback of a video segment. Example questions may include user questions in numerous varieties, such as a factual question, recall question, process question, analysis question, hypothetical question, external-domain-dependent question, recommendation question, etc. Relatedly, the term "contextual modality" refers to a medium that provides context to a question. In particular, contextual modalities can include visual context, auditory/speech context (which can be converted to textual context), etc. that corresponds to the video segment in relation to the question.

Additionally, as used herein, the term "neural network" refers to a machine learning model that can be tuned (e.g., trained) based on inputs to approximate unknown functions. In particular, the term neural network can include a model of interconnected artificial neurons (e.g., organized in layers) that communicate and learn to approximate complex functions and generate outputs based on a plurality of inputs provided to the model. For instance, the term neural network includes one or more machine learning algorithms. In addition, a neural network can refer to an algorithm (or set of algorithms) that implements deep learning techniques that utilize a set of algorithms to model high-level abstractions in data. To illustrate, a neural network can include a convolutional neural network, a recurrent neural network, an attention mechanism, a generative adversarial neural network, and/or a graph neural network. Additionally or alternatively, a neural network can include one or more encoders for generating word embeddings. Accordingly, the term "query-response-neural network" as referred to herein comprises a neural network for intelligently providing responses to questions corresponding to a video.

As referred to herein, the term "question-network layers" refers to particular layers in a neural network for analyzing questions. In particular, the question-network layers can intelligently generate query vectors (representing a question received during display or playback of a video segment. In some embodiments of the present disclosure, the question-network layers apply, in sequence for instance, word embedding functionality, convolution, and max-pooling to a transcribed or written version of a question.

As further used herein, the term "context-network layers" refers to layers in a neural network for analyzing contextual features of a video. In particular, the context-network layers can intelligently generate context vectors representing visual or transcription text as context in a video segment relative to a question. For example, using one or more visual-feature layers (e.g., one or more sub-layers of the context-network layers directed to visual features), the context-network layers can generate specific context vectors called "visual-context vectors." In particular, the visual-context vectors can include vector representations of visual features from objects (e.g., visual cues for objects such as a software-interface panel, software-interface pop-up dialogue, menu, tool, etc.) of a video segment. Examples of visual-context vectors can include a first visual-context vector corresponding to software-interface tools (if detected) within the video segment, a second visual-context vector corresponding to software-interface panels (if detected) within the video segment, a third visual-context vector corresponding to software-interface pop-up dialogues (if detected) within the video segment, and so forth. If the query-response system fails to detect one or more visual features in the video segment, in some embodiments, the query-response system may implement a visual-context vector of zeros indicating an absence or non-detection. In other embodiments, the query-response system passes only the applicable visual-context vectors through the query-response-neural network. Similarly, for example, using transcript layers (e.g., one or more sub-layers of the context-network layers directed to transcript text of a video segment), the context-network layers can generate specific context vectors called "textual-context vectors." In particular, the textual-context vectors can include vector representations of transcript text (e.g., a generated script of uttered speech) of a video segment. In some embodiments of the present disclosure, the transcript layers apply, in sequence for instance, word embedding functionality, convolution, and max-pooling to the transcript text.

Additionally, as used herein, the term "response-network layers" refers to particular layers in a neural network for analyzing candidate responses. In particular, the response-network layers can intelligently generate candidate-response vectors (representing candidate responses. For example, in some embodiments, the response-network layers generate the candidate-response vectors utilizing pre-trained vectors based on external domain knowledge to modify, weight, and/or filter candidate responses to a question. Additionally or alternatively, the response-network layers can learn embeddings of the candidate responses to generate the candidate-response vectors.

As further used herein, the term "query-context vector" refers to a combination, extraction, or portions of a query vector and one or more context vectors. In particular, in some cases, the query-context vector can include a concatenation of a query vector and one or more of context vectors. For example, in some embodiments, the query-context vector can include a concatenation of a query vector and each context vector for each timestep or video frame in a video segment. Additionally or alternatively, in some embodiments, the query-context vector can include a modified combination of a query vector and context vectors. In some such cases, the query-response system modifies one or both of the query vector or at least some of the context vectors via a recurrent neural network and/or an attention mechanism.

As additionally used herein, the term "recurrent neural network" refers to a specific type of neural network comprising nodes or layers according to a temporal sequence. In particular, a recurrent neural network can account for features for multiple inputs representing different video frames from a video segment. In some embodiments, layers of a recurrent neural network can include, for example, one or more gated-recurrent units ("GRUs"), long short-term memory units ("LSTM units"), etc.

As also used herein, the term "attention mechanism" refers to specific types of network layers that identify features of importance or emphasis. In particular, an attention mechanism can generate or modify a vector to identify weighted portions or features of one or both of a query vector or context vectors. For example, the attention mechanism can include a spatial-attention mechanism, a temporal-attention mechanism, or both in a dual-attention mechanism. In some embodiments, the spatial-attention mechanism analyzes visual features and corresponding spatial information from one or more frames of a video segment to generate a specific attention-weighted vector referred to as a "precursor query-context vector." Further, in some embodiments, the temporal-attention mechanism attends to one or more of the contextual modalities at each time step in the video segment (e.g., each video frame in the video segment) as modified according to a recurrent neural network. For example, the dual-attention mechanism can utilize the temporal-attention mechanism to attend to a hidden-feature vector from the recurrent neural network and the query vector to generate another specific attention-weighted vector (e.g., a precursor query-context vector. In turn, the spatial-attention mechanism can attend to the generated precursor query-context vector and one or more visual-context vectors to generate a query-context vector.

Additionally, the term "textual-feature embedding" refers to a word embedding corresponding to a graphical object. In particular, in some cases, the query-response system may utilize a detection neural network to perform an optical character recognition function with respect to detected visual features and generate textual-feature embeddings as a bag-of-words embeddings.

As used herein, the term "training-sample-textual-feature embedding" refers to a word embedding associated with a predefined set of data. In particular, a training-sample-textual-feature embedding can represent a particular visual-feature category (e.g., specific types of object such as a save-as dialogue, a color-editing panel, etc.) for comparison with a textual-feature embeddings. Relatedly, the term "similarity" as used herein refers to a relationship or likeness between vectors, embeddings, or other features. In particular, the query-response system can determine, based on a comparison, a similarity between textual-feature embeddings and training-sample-textual-feature embeddings. In some embodiments, the query-response system can determine a level or degree of similarity (e.g., a similarity score) between embeddings in a variety of ways, including Euclidean distance, dot product evaluation, etc. A given similarity score or range of similarity scores is referred to herein as a "threshold similarity." In particular, in some cases, the query-response system can use a threshold similarity to determine whether textual-feature embedding(s) and a given training-sample-textual feature embedding are a match.

The following paragraphs provide additional detail regarding the query-response system with reference to the figures. For example, FIG. 1 illustrates a computing system environment (or "environment") 100 for implementing a query-response system 106 in accordance with one or more embodiments. As shown in FIG. 1, the environment 100 includes server(s) 102, a client device 108, a third-party server 112, and a network 114. Each of the components of the environment 100 can communicate via the network 114, and the network 114 may be any suitable network over which computing devices can communicate. Example networks are discussed in more detail below in relation to FIG. 12.

As shown in FIG. 1, the environment 100 includes the client device 108. The client device 108 can be one of a variety of computing devices, including a smartphone, tablet, smart television, desktop computer, laptop computer, virtual reality device, augmented reality device, or other computing device as described in relation to FIG. 12. Although FIG. 1 illustrates a single client device, in some embodiments the environment 100 can include multiple client devices. The client device 108 can further communicate with the server(s) 102 via the network 114. For example, the client device 108 can receive user input and provide information pertaining to the user input (e.g., that relates to a question corresponding to a video segment) to the server(s) 102.

As shown, the client device 108 includes a client application 110. In particular, the client application 110 may be a web application, a native application installed on the client device 108 (e.g., a mobile application, a desktop application, etc.), or a cloud-based application where part of the functionality is performed by the server(s) 102. The client application 110 can present or display information to a user associated with the client device 108, including information that is responsive to a question received during display or playback of a video (e.g., a screencast tutorial). In addition, the user can interact with the client application 110 to provide user input to, for example, type or verbally dictate a question associated with the video.

As illustrated in FIG. 1, the environment 100 includes the server(s) 102. The server(s) 102 may learn, generate, store, receive, and transmit electronic data, such as executable instructions for providing a response to a question during display or playback of a video. For example, the server(s) 102 may receive data from the client device 108 based on a user input to provide a question. In turn, the server(s) 102 can transmit data (e.g., based on the question and video context at about the time the question is posed) to one or more components in the environment 100. For example, the server(s) 102 can send to the client device 108 a video for playback at the client device 108. Similarly, for example, the server(s) 102 may receive data from the client device 108 regarding the video, including data indicating a question or comment for a user. In turn, the server(s) 102 can transmit data back to the query-response system 106 and/or the third-party server 112 (e.g., a web host server) to determine a response to the question. After determining the response to the question, the server(s) 102 can relay the response to the client device 108 (e.g., for display or for audible production via the client application 110).

In these or other embodiments, the server(s) 102 can communicate with the client device 108 and the third-party server 112 to transmit and/or receive data via the network 114. For example, the server(s) 102 can coordinate with the third-party server 112 to obtain an external domain knowledge base to generate more accurate, applicable, and quality candidate answers for responding to user questions. In some embodiments, the server(s) 102 comprise a content server and/or a data collection server. The server(s) 102 can also comprise an application server, a communication server, a web-hosting server, a social networking server, or a digital content management server.

Although FIG. 1 depicts the query-response system 106 located on the server(s) 102, in some embodiments, the query-response system 106 may be implemented by on one or more other components of the environment 100 (e.g., by being located entirely or in part at one or more of the other components). For example, the query-response system 106 may be implemented by the client device 108, the third-party server 112, and/or another suitable device.

As shown in FIG. 1, in some embodiments, the query-response system 106 is implemented as part of a digital content management system 104 located on the server(s) 102. The digital content management system 104 can organize, manage, and/or execute analyzing questions, provisioning responses to the questions, etc. For example, the digital content management system 104 can detect or receive user questions, provide information regarding the question and the video to the query-response system 106, and direct the query-response system 106 to respond accordingly. Further, in some embodiments, the digital content management system 104 determines the manner in which a response should be provided to a user at the client device 108, whether visually via certain graphics or video clips, in digital text form, and/or audible recitations.

In some embodiments, though not illustrated in FIG. 1, the environment 100 may have a different arrangement of components and/or may have a different number or set of components altogether. For example, the client device 108 and/or the third-party server 112 may communicate directly with the query-response system 106, bypassing the network 114.

Figure 2:
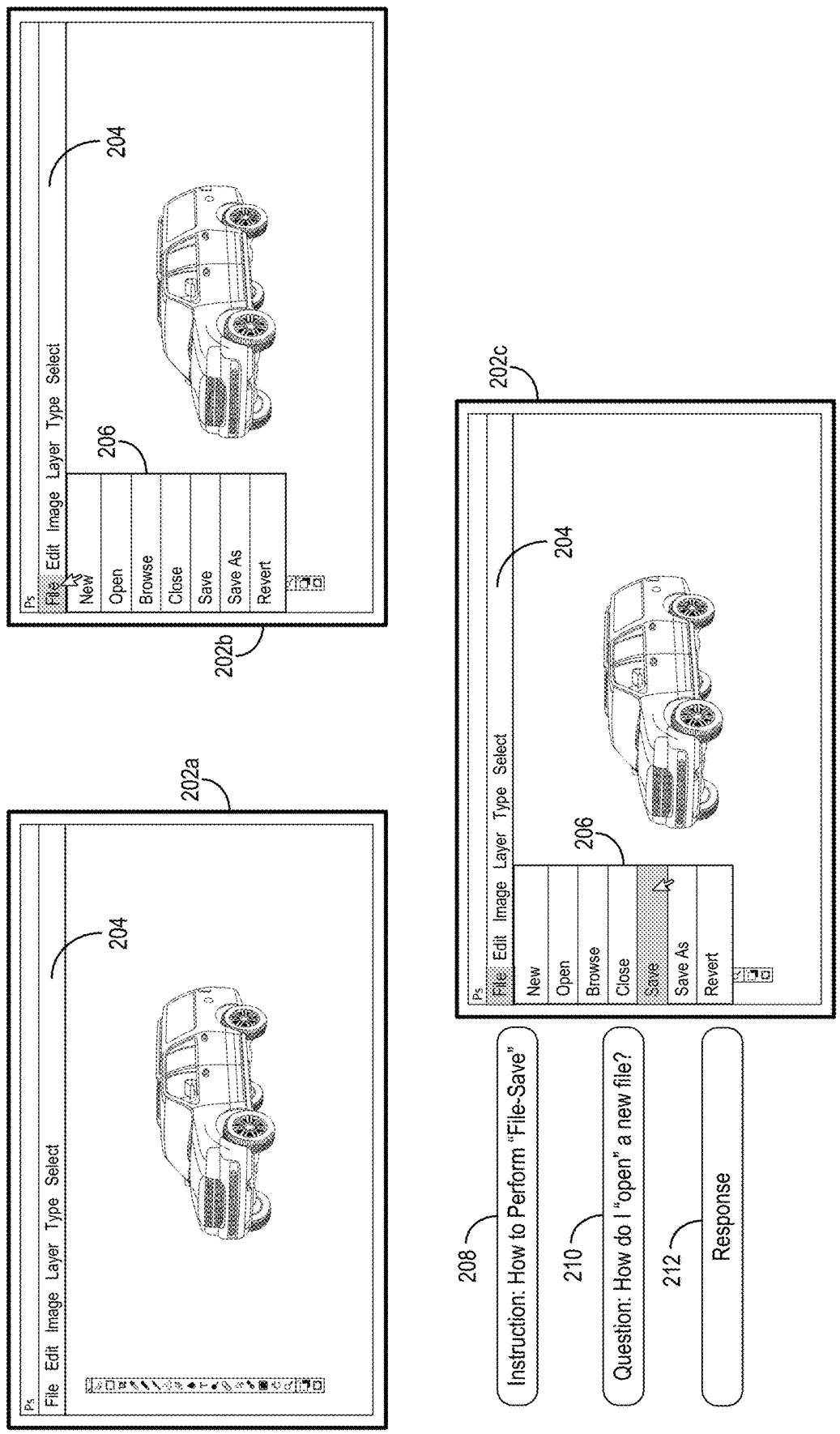
FIG. 2 illustrates video frames of a video segment for which a query-response system can provide a response to a question in accordance with one or more embodiments.

As mentioned above, unlike conventional video systems, the query-response system 106 can more accurately respond to various types of questions associated with a video segment. Such questions may involve context beyond text provided by a transcript of the video segment. In accordance with one or more embodiments, FIG. 2 illustrates video frames 202a-202c with reference to which the query-response system 106 can provide a response 212 to a question 210. As shown in FIG. 2, the video frames 202a-202c correspond to instructions 208 regarding how to perform a first operation using a software application (e.g., "How to perform 'File-Save'"). Further, during playback of a video segment comprising the video frames 202a-202c, the query-response system 106 receives the question 210 regarding a second operation using the software application (e.g., "How do I open a new file?").

To determine the response 212 to the question 210, the query-response system 106 can analyze transcript text for the video frames 202a-202c corresponding to the instructions 208 regarding how to perform the first operation. However, analyzing the transcript text alone is insufficient to provide the correct response 212. Accordingly, the query-response system 106 can also analyze visual features depicted in one or more of the video frames 202a-202c. For example, the query-response system 106 can analyze visual features representing a menu bar 204 in each of the video frames 202a-202c and visual features depicting a drop-down menu 206 in the video frames 202b-202c. Thus, even though the instructions 208 correspond to a first operation (and not the second operation), the query-response system 106 can perform acts and algorithms disclosed herein to provide the response 212 based on the visual features of the video frames 202a-202c. Namely, the query-response system 106 can provide the response 212 that may describe, explain, or otherwise illustrate where a user can find an option corresponding to the second operation, such as a file-open button in the drop-down menu 206.

Figure 3:
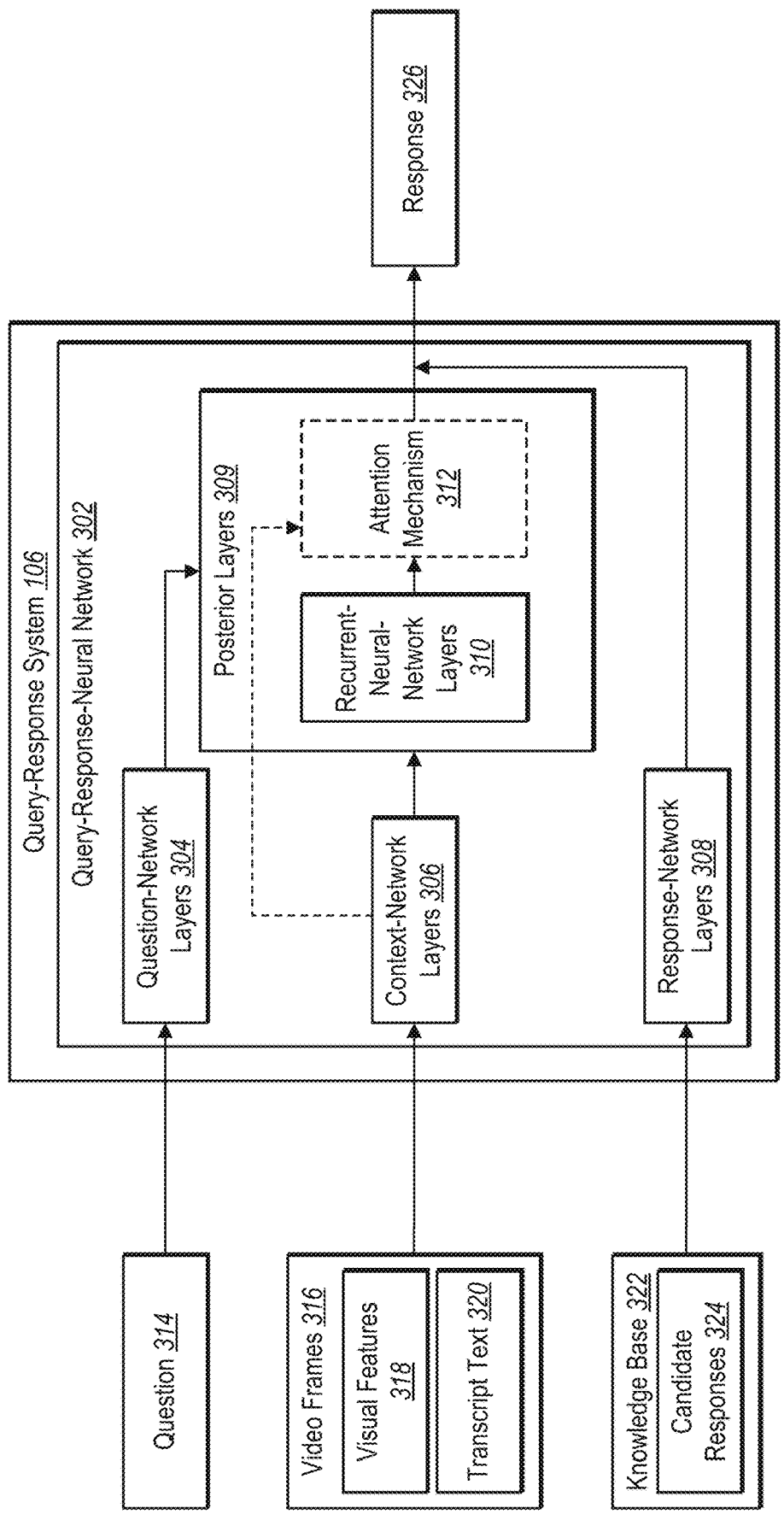
FIG. 3 illustrates a schematic diagram of a query-response system utilizing a query-response-neural network to provide a response to a question in accordance with one or more embodiments.

As mentioned above, the query-response system 106 can utilize a query-response-neural network to analyze multiple contextual modalities of a video segment and therefore provide improved responses to questions. In accordance with one or more embodiments of the present disclosure, FIG. 3 illustrates a schematic diagram of the query-response system 106 utilizing a query-response-neural network 302 to provide a response 326 based on a question 314. As shown, the query-response-neural network 302 comprises question-network layers 304, context-network layers 306, response-network layers 308, and posterior layers 309. As further shown, the posterior layers 309 comprise recurrent-neural-network layers 310 and optionally (as denoted by the dotted lines) an attention mechanism 312. As described below, the query-response system 106 analyzes (i) the question 314 using the question-network layers 304, (ii) video frames 316 using the context-network layers 306, and (iii) candidate responses 324 using the response-network layers 308. In so doing, the query-response system 106 can generate the response 326 in real-time (or approximately real-time) after receiving the question 314.

In some embodiments, the query-response system 106 receives an indication of the question 314 as pertaining to a portion of a video in playback mode at a client device. In particular, the client device can transmit one or more user inputs indicating the question 314 to the query-response system 106. The query-response system 106 subsequently analyzes transcribed or written version of the question 314 using the question-network layers 304. At the question-network layers 304, the query-response-neural network 302 can apply one or more neural-network layers specifically trained to generate a query vector (e.g., a vector representation of the question 314).

To do so, in some embodiments, the question-network layers 304 generate word embeddings of the question 314 using a word-vector-representational model such as word2vec (as described in Tomas Mikolov, Ilya Sutskever, Kai Chen, Greg Corrado, and Jeffrey Dean, *Distributed Representations Of Words And Phrases And Their Compositionality*, In Proceedings of the 26th International Conference on Neural Information Processing Systems—Volume 2, NIPS' 13, 2013, pages 3111-3119, USA. Curran Associates Inc., hereby incorporated by reference in its entirety), fastText (as described in Piotr Bojanowski, Edouard Grave, Armand Joulin, and Tomas Mikolov, *Enriching Word Vectors With Subword Information*, in Transactions of the Association for Computational Linguistics, Volume 5, pages 135-146, hereby incorporated by reference in its entirety), or GloVe (as described in Jeffrey Pennington, Richard Socher, and Christopher, D. Manning, *Glove: Global Vectors For Word Representation*, In EMNLP, 2014, hereby incorporated by reference in its entirety). After the question-network layers 304 generate word embeddings of the question 314, the question-network layers 304 can analyze the word embeddings using neural-network layers, such as a convolutional neural network or convolutional layers, and then perform a max pooling operation (e.g., as described in Yoon Kim, *Convolutional Neural Networks For Sentence Classification*, In Proceedings of the EMNLP, 2014, pages 1746-1751, hereby incorporated by reference in its entirety) to generate a query vector.

Figure 4:
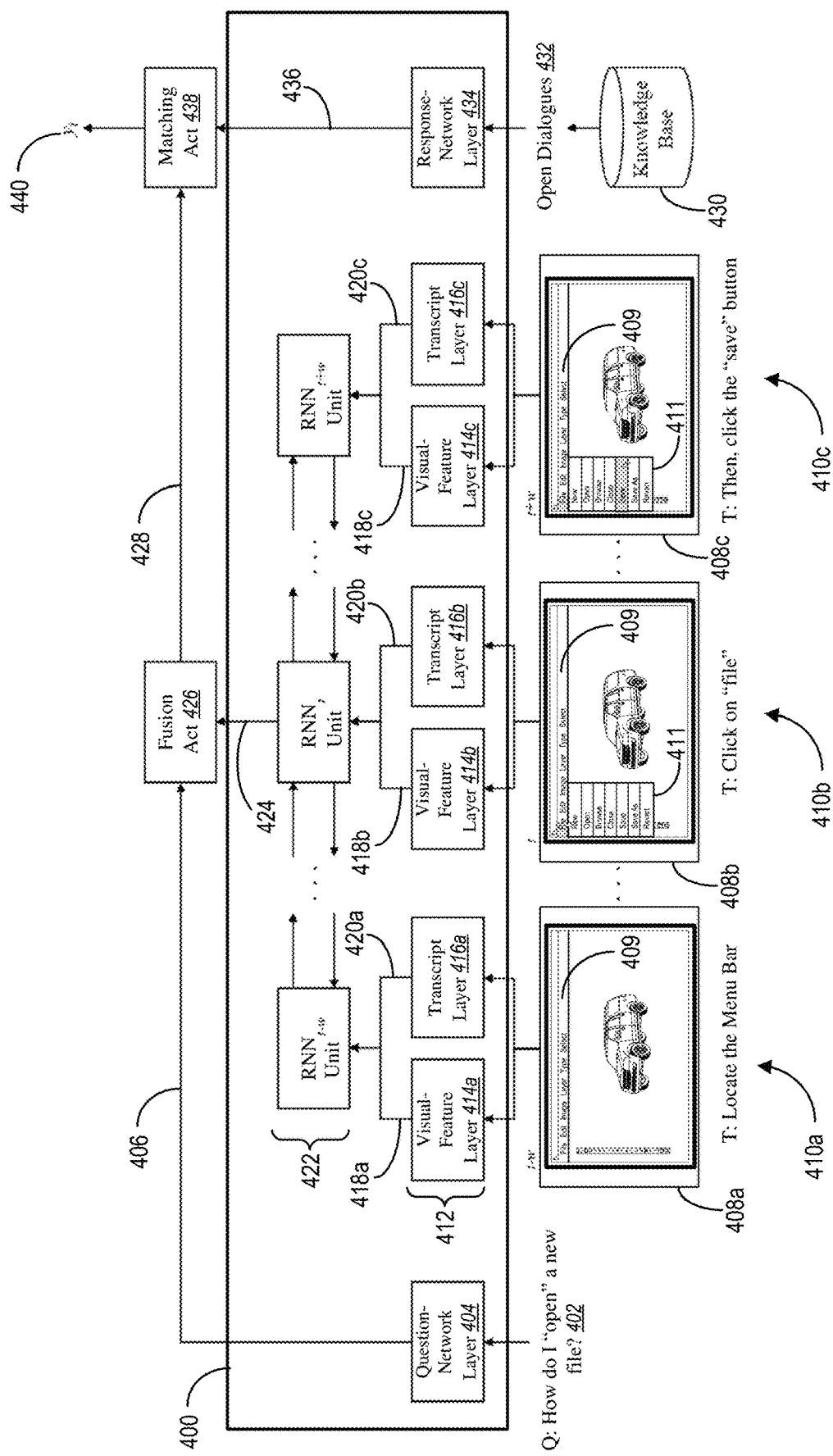
FIG. 4 illustrates a schematic diagram of a query-response system utilizing a query-response-neural network to determine a matching-candidate-response vector in response to a question in accordance with one or more embodiments.

As already mentioned, the query-response system 106 analyzes the video frames 316 using the context-network layers 306. In FIG. 3, the video frames 316 include visual features 318 and transcript text 320. As indicated above, in certain implementations, each video frame includes distinct visual features and can correspond to distinct transcript text or transcript text shared with other video frames. In some cases, the visual features 318 include, but are not limited to, visual aspects of the video to which the question 314 is related. Similarly, the transcript text 320 includes the transcribed words spoken in the video to which the question 314 is related. To analyze the video frames 316 to the context-network layers 306, in some embodiments, the query-response system 106 passes the visual features 318 to visual-feature layers of the context-network layers 306 and passes the transcript text 320 to transcript layers of the context-network layers 306 (e.g., as shown in FIG. 4). As part of the visual-feature layers, in some embodiments, the query-response system 106 applies (i) one or more detection neural networks to the visual features 318 and (ii) a graphical-object-matching engine to the visual features 318 to generate visual-context vectors.

In some cases, the context-network layers 306 similarly generate word embeddings representing the transcript text 320. In addition, the context-network layers 306 can analyze the word embeddings using a convolutional neural network and perform a max pooling operation. By passing the transcript text 320 for different video frames through the context-network layers 306, the query-response system 106 generates textual-context vectors based on the transcript text 320. Thus, at the context-network layers 306, the query-response system 106 can extract from the video frames 316 dual contextual modalities from a video segment and thereby generate vectors representing both the visual features 318 and the transcript text 320 from the video segment.

After the context-network layers 306 generates visual-context vectors and textual-context vectors, the query-response-neural network 302 can apply the posterior layers 309 to one or more of such context vectors—including one or both of the recurrent-neural-network layers 310 and the attention mechanism 312. For instance, to learn temporal dynamics of the multi-modality context of the video frames 316 relative to the question 314, the query-response system 106 can pass the video frames 316 to bidirectional recurrent layers using gated recurrent units of the recurrent-neural network layers 310 (e.g., as described in Kyunghyun Cho, Bart van Merrienboer, Caglar Gulcehre, Dzmitry Bandanau, Fethi Bougares, Holger Schwenk, Yoshua Bengio, *Learning Phrase Representations Using RNN Encoder-Decoder For Statistical Machine Translation*, In EMNLP, 2014, hereby incorporated by reference in its entirety). As output from the recurrent-neural-network layers 310, the query-response-neural network 302 can then pass one or more hidden-feature vectors to the attention mechanism 312 for specific attention to temporal and/or spatial aspects of the one or more hidden-feature vectors. Additionally or alternatively (as denoted by the dotted arrow), the query-response-neural network 302 can pass one or more of the context vectors as generated at the context-network layers 306 directly to the attention mechanism 312 (without passing to the recurrent-neural-network layers 310) for specific attention to temporal and/or spatial aspects of the one or more context vectors. Further detail regarding the attention mechanism 312 is provided below in relation to FIGS. 5A-5C.

Based on the attention weights applied to the various vectors input into the attention mechanism 312, the query-response-neural network 302 generates a query-context vector for comparison with candidate-response vectors. In other embodiments (as denoted by the dotted box for the attention mechanism 312), the query-response-neural network 302 does not utilize the attention mechanism 312. Instead, the query-response-neural network 302 can combine the query vector with one or more of the context vectors or the hidden-feature vectors to generate a query-context vector (without attention modifications thereto). Regardless of the format for constituents of such a query-context vector, the query-response system 106 compares the query-context vector with candidate-response vectors to select the response 326.

To generate the candidate-response vectors just mentioned, the response-network layers 308 can identify responses from the candidate responses 324 based on a knowledge base 322. The knowledge base 322 can include responses for a plurality of questions, not just potential responses to the question 314. In one example, the knowledge base 322 includes responses to questions gathered for a plurality of videos on a domain or subject, not just a single video on that subject. For instance, the knowledge base 322 may include responses for questions asked about a tutorial video included with the license of an image editing application (e.g., a tutorial video on a DVD for the image editing application), and an instructional video available online and made by a user of the image editing application. In some embodiments, for a given domain or subject, such as videos about using Adobe Photoshop®, the knowledge base 322 is not tied to a specific video regarding that domain or subject. Instead, the knowledge base 322 includes responses appropriate to any video on the domain or subject, even if one of those videos was not used to generate responses that are included in the knowledge base 322 as one of the candidate responses 324.

In one example, the response-network layers 308 exploit the external domain knowledge in the knowledge base 322 by generating candidate-response vectors from the candidate responses 324. In these or other embodiments, the candidate responses 324 are based on a graph structure that represents the linkage of responses, entities, and options of the knowledge base 322. For instance, the response-network layers 308 may include an encoder that generates a respective candidate-response vector for each of the candidate responses 324. In these or other embodiments, the response-network layers 308 can include any suitable encoder, such as a neural network (e.g., a convolutional neural network) that receives a representation of a candidate response (e.g., a concatenation of the words in the candidate response), and generates a candidate-response vector for the candidate response, such as a vector representing features of the candidate response.

In addition, the response-network layers 308 may include a graph structure of the knowledge base 322 and configure the response encoder based on the graph structure. In one example, the query-response system 106 configures the response encoder based on a graph structure by adjusting weights (e.g., convolution weights) of the response encoder with vectors determined from embeddings based on the graph structure (as described in B. Perozzi et al., *Deepwalk: Online Learning Of Social Representations*, In the Proceedings of the 20$^{th}$ ACM SIGKDD International Conference on Knowledge Discovery and Data Mining, 2014, pages 701-710, hereby incorporated by reference in its entirety). For instance, the query-response system 106 may initialize the response encoder using vectors determined from embeddings based on the graph structure, and trained together with other components of the query-response system 106 using triplets including a question-response pair generated by a knowledgeable user (e.g., professional artist), and context of the video (e.g., audio sentences).

Additionally or alternatively, the query-response system 106 may configure the response encoder without using a graph structure of the knowledge base 322. For instance, the query-response system 106 may configure the response encoder with a random initialization (e.g., randomly-selected convolution weights), and train the response encoder based on the triplets of questions, responses, and context. In some implementations, the response encoder of the response-network layers 308 includes a sentence encoder, such as a same or similar word-vector-representational model as described above and used in the question-network layers 304 and the context-network layers 306. For instance, the response encoder may apply the sentence encoder to any suitable description of a candidate response. Examples of such descriptions of a candidate response include a concatenation of the words in the candidate response, a title of the candidate response, combinations thereof, and the like. Further, in some implementations, a candidate response may include a keyboard shortcut (e.g., "alt-control-delete"). Thus, a title in the knowledge base 322 for the corresponding candidate response may include text for the keyboard shortcut (e.g., "shortcut for restart action") so that the question-network layers 304 in some embodiments applies the sentence encoder to the text of the title.

With the generated candidate-response vectors, the query-response system 106 can then compare the candidate-response vectors with the query-context vector described above. In particular, the query-response system 106 can determine respective similarity scores between the query-context vector and one or more of the candidate-response vectors. Based on the similarity scores, the query-response system 106 can select a corresponding candidate response as the response 326. For example, the query-response system 106 may select a candidate response as the response 326 based on the candidate-response vector for the candidate response satisfying a threshold similarity. This comparison of the candidate-response vectors with the query-context vector for determining a response to a user question is described more in relation to FIG. 4 below.

As mentioned above, the query-response system 106 utilizes a query-response-neural network to account for multiple contextual modalities from a video to provide accurate responses to questions received during playback of the video. In accordance with one or more embodiments, FIG. 4 illustrates a schematic diagram of the query-response system 106 utilizing an example architecture of a query-response-neural network 400 to determine a selected response 440 in response to a question 402. As shown, the query-response system 106 can receive the question 402 from a user device regarding an operation in a software application (e.g., opening of a new file). For example, during playback of a particular portion of a video comprising a video segment with video frames 408a-408c, the query-response system 106 may receive the question 402 as submitted from the user device. In turn, the query-response system 106 can pass the question 402 to the question-network layers 404 as described above to generate a query vector 406.

Additionally, the query-response system 106 can extract multiple contextual modalities from each of the video frames 408a-408c utilizing context-network layers 412. In particular, the query-response system 106 can extract visual features representing an object (e.g., a menu bar 409) from the video frame 408a associated with a first timestep t–w. As shown in FIG. 4, w refers to a window size in terms of the number of transcript sentences before and/or after time t. Based on the extracted visual features from the video frame 408a, the query-response system 106 can generate one or more corresponding visual-context vectors 418a by using a visual-feature layer 414a in the query-response-neural network 400. To do so, the visual-feature layer 414a can implement one or more detection neural networks in addition to a graphical-object-matching engine (as described more below in conjunction with FIGS. 6A-6C and FIG. 7).

Further, the query-response system 106 can extract textual features from transcript text 410a associated with the video frame 408a and thereby generate one or more textual-context vectors 420a by using a transcript layer 416a in the query-response-neural network 400. To do so, the transcript layer 416a can implement one or more word-vector-representation models to generate word embeddings, input the word embeddings to a neural network, such as a convolutional neural network, and perform a max pooling operation (as described above in relation to the question-network layers 304 and the transcript layers of the context-network layers 306 of FIG. 3).

Similarly, the query-response system 106 can extract visual features representing objects (e.g., the menu bar 409 and a drop-down menu 411) from the video frame 408b associated with a second timestep t. Based on the extracted visual features from the video frame 408b, the query-response system 106 can generate one or more corresponding visual-context vectors 418b by using a visual-feature layer 414b in the query-response-neural network 400. To do so, the visual-feature layer 414b can implement one or more detection neural networks in addition to a graphical-object-matching engine (as described more below in conjunction with FIGS. 6A-6C and FIG. 7). Further, the query-response system 106 can extract textual features from transcript text 410b associated with the video frame 408b and thereby generate one or more textual-context vectors 420b by using a transcript layer 416b in the query-response-neural network 400. To do so, the query-response system 106 can implement, at transcript layer 416b, one or more word-vector-representation models to generate word embeddings. In addition, the query-response system 106 can input the word embeddings to a neural network of the transcript layer 416b, such as a convolutional neural network. In turn, the query-response system 106 can instruct the transcript layer 416b to perform a max pooling operation (as described above in relation to the question-network layers 304 and the transcript layers of the context-network layers 306 of FIG. 3).

In a same or similar manner as just described, the query-response system 106 can extract visual features representing objects (e.g., the menu bar 409 and the drop-down menu 411) from the video frame 408c associated with a third timestep t+w. Based on the extracted visual features from the video frame 408c, the query-response system 106 can generate one or more corresponding visual-context vectors 418c by using a visual-feature layer 414c in the query-response-neural network 400. Likewise, the query-response system 106 can extract textual features from transcript text 410c associated with the video frame 408c and thereby generate one or more textual-context vectors 420c by using a transcript layer 416c in the query-response-neural network 400.

In turn, the query-response system 106 can pass the context vectors generated at the context-network layers 412 to a recurrent neural network 422. As shown in FIG. 4, the recurrent neural network 422 includes multiple units, such as GRUs or LSTM units. Specifically, the query-response system 106 can pass one or more of the visual-context vectors 418a and the textual-context vectors 420a to a portion of the recurrent neural network 422 for the first timestep t−w. Similarly, the query-response system 106 can pass one or more of the visual-context vectors 418b and the textual-context vectors 420b to a portion of the recurrent neural network 422 for the second timestep t. Further, the query-response system 106 can pass one or more of the visual-context vectors 418c and the textual-context vectors 420c to a portion of the recurrent neural network 422 for the third timestep t+w. Based on passing the context vectors to the recurrent neural network 422, the recurrent neural network 422 can output a hidden-feature vector 424 comprising a modified version of one or more of the context vectors for an improved response to the question 402.

At a fusion act 426, the query-response system 106 combines the query vector 406 and the hidden-feature vector 424 to generate a query-context vector 428. The fusion act 426 can generate the query-context vector 428 from the query vector 406 and the hidden-feature vector 424 in any suitable way. In one example, the fusion act 426 fuses the query vector 406 and the hidden-feature vector 424 by concatenating the query vector 406 and the hidden-feature vector 424, interleaving elements of the query vector 406 with elements of the hidden-feature vector 424 to generate the query-context vector 428. For instance, the fusion act 426 may generate the query-context vector 428 according to the example expression $v_q \oplus v_c$, where $\oplus$ denotes concatenation, $v_q$ is the query vector 406 including elements of the question 402, and $v_c$ is the hidden-feature vector 424 including elements of the context vectors generated by the context-network layers 412. Other suitable combinations are herein contemplated (e.g., weighted combinations).

In addition, the query-response system 106 generates candidate-response vectors 436 utilizing response-network layers 434. In particular, the query-response system 106 can provide to the response-network layers 434 one or more open dialogues 432 from a knowledge base 430 comprising external domain knowledge from knowledgeable users (e.g., professional/expert artists). The one or more open dialogues 432 represent the visual features or entities associated with an operation in a software application (e.g., opening a new file) and corresponding external domain knowledge for doing so. In addition to the one or more open dialogues 432, in some embodiments, the query-response system 106 provides the response-network layers 434 a variety of the entities or visual features associated with the external domain knowledge, including visual features (e.g., tools, panels, pop-up dialogues, etc.) that may not necessarily relate to opening a file. After receiving the one or more open dialogues 432, the response-network layers 434 can proceed to generate corresponding word embeddings as the candidate-response vectors 436 (e.g., utilizing a word-vector-representation model as described above for the response-network layers 308 of FIG. 3).

In turn, the query-response system 106 can, at a matching act 438, compare the query-context vector 428 with the candidate-response vectors 436 to determine the selected response 440. In these or other embodiments, the selected response 440 may include a matching-candidate-response vector—based upon which the query-response system 106 selects a candidate response as the selected response 440 to the question 402. In some embodiments, the matching act 438 can include any suitable system that generates a response to the question 402 by processing the query-context vector 428, for example, without the use of the candidate-response vectors 436 from the response-network layers 434. In one example, the matching act 438 includes a neural network with fully-connected layers and a softmax operation at a final layer. The query-response system 106 can pass the query-context vector 428 to the neural network which processes it with the fully-connected layers, and determines the selected response 440 from the output of the softmax operation at the final layer. The query-response system 106 may train the neural network using triplets including a question-response pair generated by a knowledgeable user and context of the video (e.g., transcribed sentences). Hence, the matching act 438 can determine the selected response 440 based on a multi-class classification utilizing a trained neural network.

Additionally or alternatively, the query-response system 106 may configure the matching act 438 to include any suitable circuitry to match the query-context vector 428 with the candidate-response vectors 436. For instance, the matching act 438 may determine respective matching scores between the query-context vector 428 and the candidate-response vectors 436. Matching scores may include dot products between the query-context vector 428 and the candidate-response vectors 436. Based on the dot products, the query-response system 106 may rank candidate responses. Additionally or alternatively, the matching act 438 may determine the selected response 440 to the question 402 by choosing a matching-candidate-response vector whose corresponding dot product with the query-context vector 428 is the highest value relative to other dot products. Accordingly, the query-response system 106 can determine the selected response 440 to the question 402 received during video display or playback by solving a ranking problem, $$y = \underset{a \in A}{\operatorname{argmax}} f(q, c, a)$$

where a denotes a candidate response in a response pool A, q denotes a question, and c denotes context of the video (e.g., transcribed sentences of the video's audio in a time segment that includes a time at which the question is asked). The operator f generates a matching score for the triplet (q, c, a).

In one example, the matching act 438 applies a matching threshold to the matching scores by comparing each of the matching scores for the candidate-response vectors 436 (e.g., dot products between the query-context vector 428 and each of the candidate-response vectors 436) to the matching threshold. Additionally, the matching act 438 may require that a matching score satisfy the matching threshold in order to qualify as a response to the question 202. Hence, the matching threshold may represent a minimum (or maximum) matching score that a given candidate-response vector must satisfy to be selected as corresponding to the selected response 440.

With the selected response 440 determined, the query-response system 106 can present the selected response 440 to the question 402 to a client device. The query-response system 106 can present the selected response 440 to the client device in any suitable way, such as via audio recitations of the selected response 440 or via a user interface with text, video, combinations thereof, and the like. Additionally or alternatively, the query-response system 106 may cause a portion of a video to play at the client device in response to the matching act 438 determining the selected response 440. For instance, the query-response system 106 may determine a portion of the video related to the question 402 (e.g., a portion of the video in which a presenter is discussing a topic relevant to the question). As part of providing the response to the user, the query-response system 106 may play or replay this portion of the video to the user. Additionally or alternatively, the query-response system 106 may cause the client device to display and/or audibly recite portions of the response to the question 402.

Figure 5A:
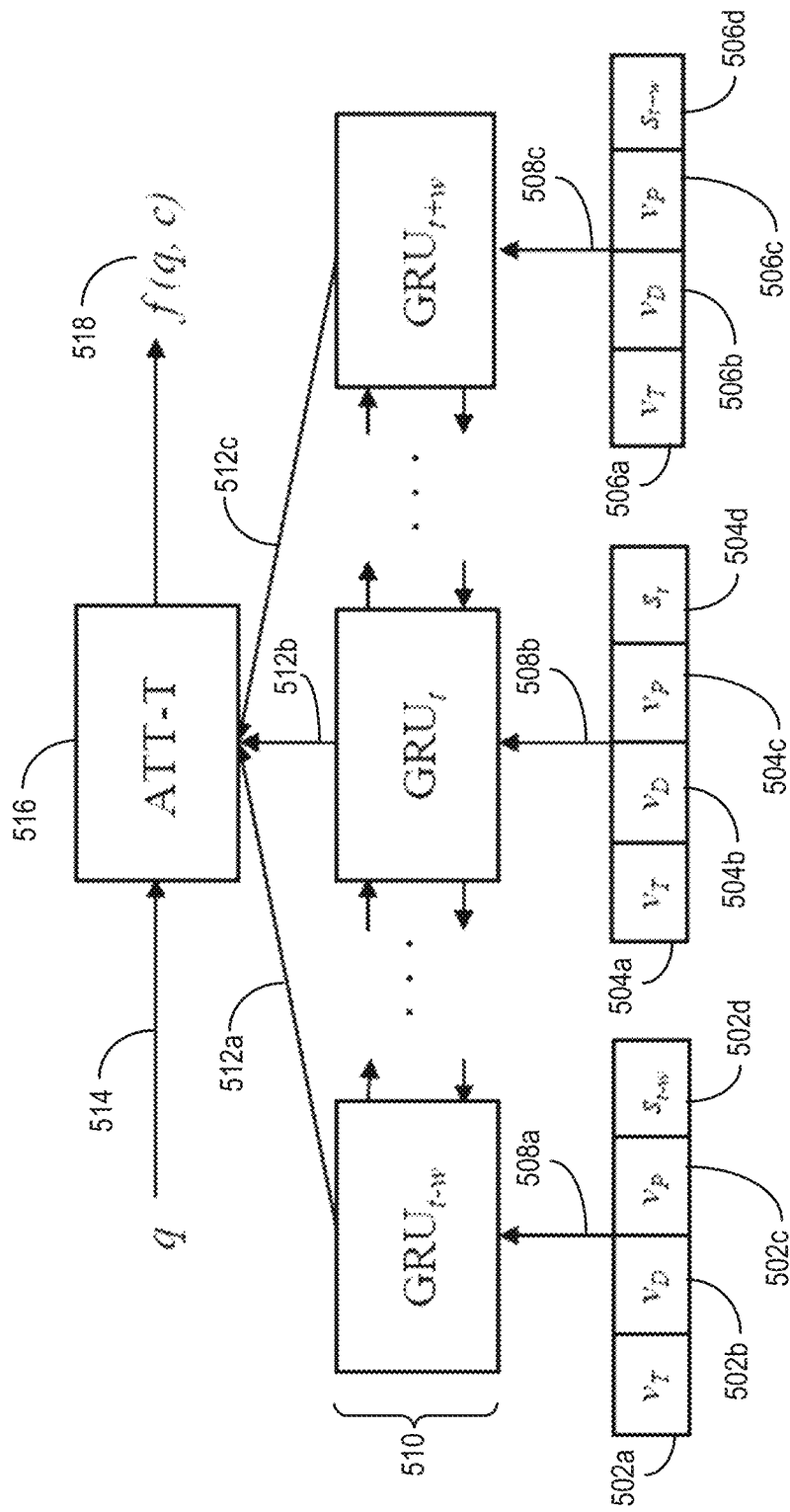
FIGS. 5A-5C illustrate a query-response system utilizing a query-response-neural network with respective attention mechanisms in accordance with one or more embodiments.
Figure 5B:
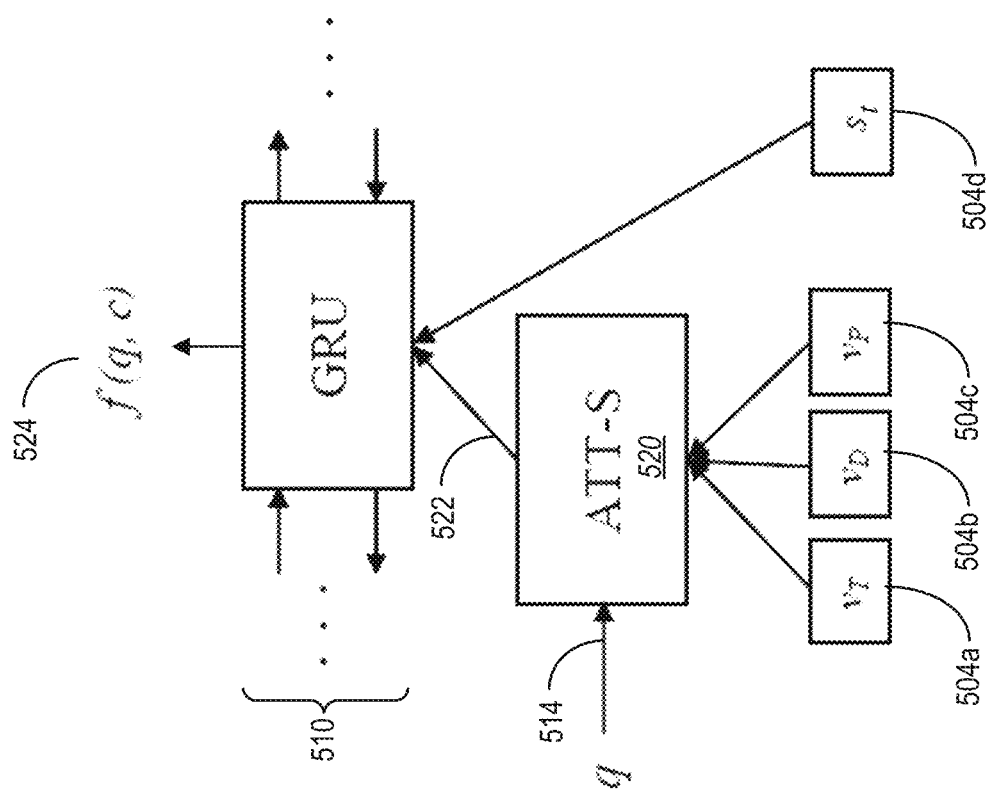
Figure 5C:
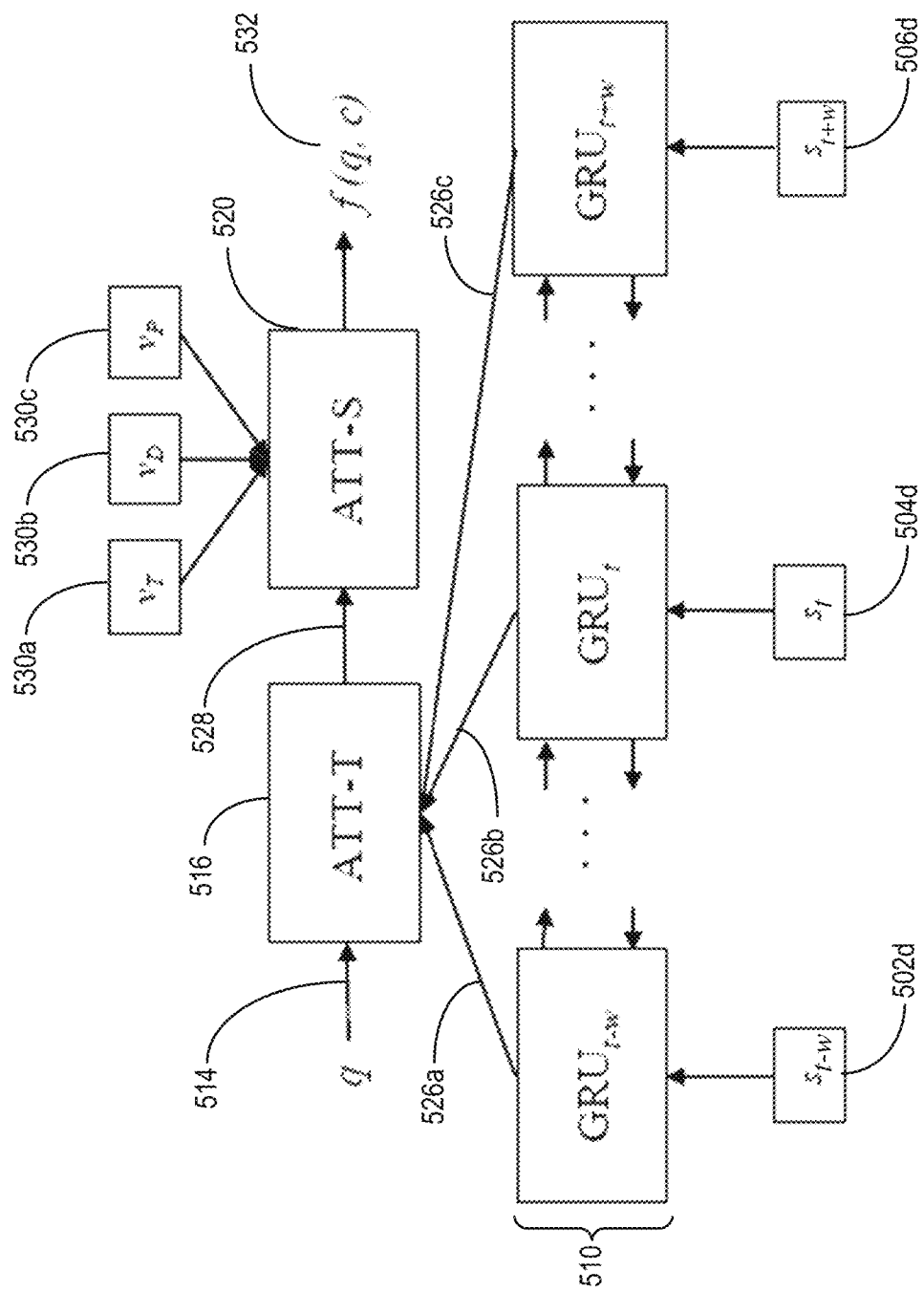

As mentioned above, the query-response system 106 can, in some embodiments, utilize an attention mechanism to generate an attention-weighted vector with learned attention weights applied to portions of one or both of the query vector or the context vectors, thereby improving responses to questions received during display or playback of a video. FIGS. 5A-5C illustrate the query-response system 106 utilizing a query-response-neural network with respective attention mechanisms in accordance with one or more embodiments of the present disclosure. As shown in FIG. 5A, the query-response system 106 analyzes the context of a video segment at each time step (e.g., t−w through t+w). In particular, the query-response system 106 passes respective context vectors 508a-508c to corresponding portions of a recurrent neural network comprising a gated recurrent unit ("GRU") layers 510.

For example, the query-response system 106 passes the context vector 508a to a portion of the GRU layers 510 (e.g., a GRU) associated with the first timestep t−w. In more detail, the context vector 508a accounts for context relative to a first timestep in a video segment (e.g., a video frame at time t−w). As shown, the context vector 508a comprises visual-context vectors 502a-502c and a textual-context vector 502d associated with transcript text, all corresponding to the first timestep in the video segment. In some embodiments, the visual-context vectors 502a-502c each represent different visual objects or visual categories. For instance, the visual-context vectors 502a-502c may each correspond to different software-user-interface components, such as software-user-interface tools, software-user-interface dialogues, and software-user-interface panels.

Similarly, the query-response system 106 passes the context vector 508b to a portion of the GRU layers 510 associated with a second timestep (e.g., a video frame at time t). The context vector 508b accounts for context relative to the second timestep in a video segment. Further, the context vector 508b comprises visual-context vectors 504a-504c and a textual-context vector 504d associated with transcript text, all corresponding to the second timestep in the video segment. In some embodiments, the visual-context vectors 504a-504c each similarly represent different visual objects or visual categories.

Likewise, the query-response system 106 passes the context vector 508c to a portion of the GRU layers 510 associated with a third timestep (e.g., a video frame at time t+w). The context vector 508c accounts for context relative to the third timestep in the video segment. Further, the context vector 508c comprises visual-context vectors 506a-506c and a textual-context vector 506d associated with transcript text, all corresponding to the third timestep in the video segment.

Alternatively, in some embodiments, one or more of the visual-context vectors 502a-502c, 504a-504c, or 506a-506c may comprise a vector of zeros as applicable. Such zeros may indicate an absence of a corresponding visual object or visual category in that video frame of the video segment. Additionally, or alternatively, one or more of the context vectors 508a-508c may comprise only applicable visual-feature vectors as opposed to including a vector of zeros representing an absence of a given visual object or visual category within a video frame.

By passing the above-described context vectors 508a-508c to the respective portions of the GRU layers 510, the query-response system 106 can generate hidden-feature vectors 512a-512c. In turn, the query-response system 106 can pass the hidden-feature vectors 512a-512c to a temporal-attention mechanism 516. The temporal-attention mechanism 516 focuses the contextual modalities from the video according to time. To do so, in some embodiments, the temporal-attention mechanism 516 generates an attention weight at each timestep, for example, using softmax output of a multi-layer perceptron that takes input vectors comprising the hidden-feature vectors 512a-512c and a query vector 514 representing elements of a question. The temporal-attention mechanism 516 can then apply the generated attention weights to further generate a query-context vector 518, which combines the query vector 514 and the hidden-feature vectors 512a-512c (as described above in relation to the foregoing figures).

In another embodiment, FIG. 5B illustrates the query-response system 106 utilizing a spatial-attention mechanism 520 to generate a precursor query-context vector 522 for passing to the GRU layers 510 in accordance with one or more embodiments of the present disclosure. In particular, the query-response system 106 passes the query vector 514 and the visual-context vectors 504a-504c (for the second timestep t) to the spatial-attention mechanism 520. The spatial-attention mechanism 520 weights the visual context from the video according to position or location within a given frame. For each of the video frames corresponding to the first timestep t−w, the second timestep t−w, and the third timestep t+w, in certain implementations, the query-response system 106 inputs visual-context vectors for the corresponding video frame into a spatial-attention mechanism.

For instance, in some embodiments, the spatial-attention mechanism 520 generates an attention weight for each pairing of the query vector 514 with one of the visual-context vectors 504a-504c. To do so for example, the attention mechanism can use a softmax output of a multi-layer perceptron that takes input vectors comprising the query vector 514 and the visual-context vectors 504a-504c. The spatial-attention mechanism 520 can then apply the generated attention weights to further generate the precursor query-context vector 522, which combines the query vector 514 and the visual-context vectors 504a-504c (e.g., via a weighted concatenation as similarly described above in relation to the foregoing figures). For each of the video frames corresponding to the first timestep t−w, the second timestep t−w, and the third timestep t+w, in certain implementations, the query-response system 106 likewise generates a precursor query-context vector based on a corresponding query vector and corresponding visual-context vectors.

As further shown in FIG. 5B, the query-response system 106 passes the precursor query-context vector 522 and the textual-context vector 504d (associated with transcript text for the second timestep t) to the GRU layers 510. By inputting both the precursor query-context vector 522 and the textual-context vector 504d into the GRU layers 510, the query-response system 106 can accordingly generate the query-context vector 524.

As indicated above, in some embodiments, the query-response system 106 performs one or more of the foregoing acts and algorithms illustrated in FIG. 5B for one or more additional timesteps in the video segment (e.g., for timesteps t−w and t+w). In this manner, the query-response system 106 can weight spatial aspects of the visual features at various frames of a video segment, or all frames of a video segment.

In additional embodiment, FIG. 5C illustrates the query-response system 106 utilizing both the temporal-attention mechanism 516 and the spatial-attention mechanism 520 for generating a query-context vector 532 in accordance with one or more embodiments of the present disclosure. In particular, the query-response system 106 passes the textual-context vectors 502d-506d to respective portions of the GRU layers 510 for generating corresponding hidden-feature vectors 526a-526c. In turn, the query-response system 106 passes the query vector 514 and the hidden-feature vectors 526a-526c to the temporal-attention mechanism 516 to generate a precursor query-context vector 528. The precursor query-context vector 528 represents a combination of the query vector 514 and the hidden-feature vectors 526a-526c (e.g., via a weighted concatenation as similarly described above in relation to the foregoing figures).

As shown in FIG. 5C, the query-response system 106 passes the precursor query-context vector 528 and the visual-context vectors 530a-530c to the spatial-attention mechanism 520. In so doing, the query-response system 106 generates a query-context vector 532. The query-context vector 532 represents a combination of the precursor query-context vector 528 and the visual-context vectors 530a-530c. In some embodiments, the visual-context vectors 530a-530c correspond to a particular video frame at a particular timestep (e.g., timestep t). Alternatively, in some embodiments, the query-response system 106 passes additional or alternative visual-context vectors. For example, in some embodiments, the query-response system 106 inputs the visual-context vectors 502a-502c (for the first timestep t−w), the visual-context vectors 504a-504c (for the second timestep t), and/or the visual-context vectors 506a-506c (for the third timestep t+w) into the spatial-attention mechanism 520. By contrast, in certain implementations, the query-response system 106 inputs a concatenated version of visual-context vectors for each visual object or visual category (e.g., software-user-interface tool) corresponding to multiple timesteps (e.g., first timestep t−w, second timestep t, and third timestep t+w).

Figure 6A:
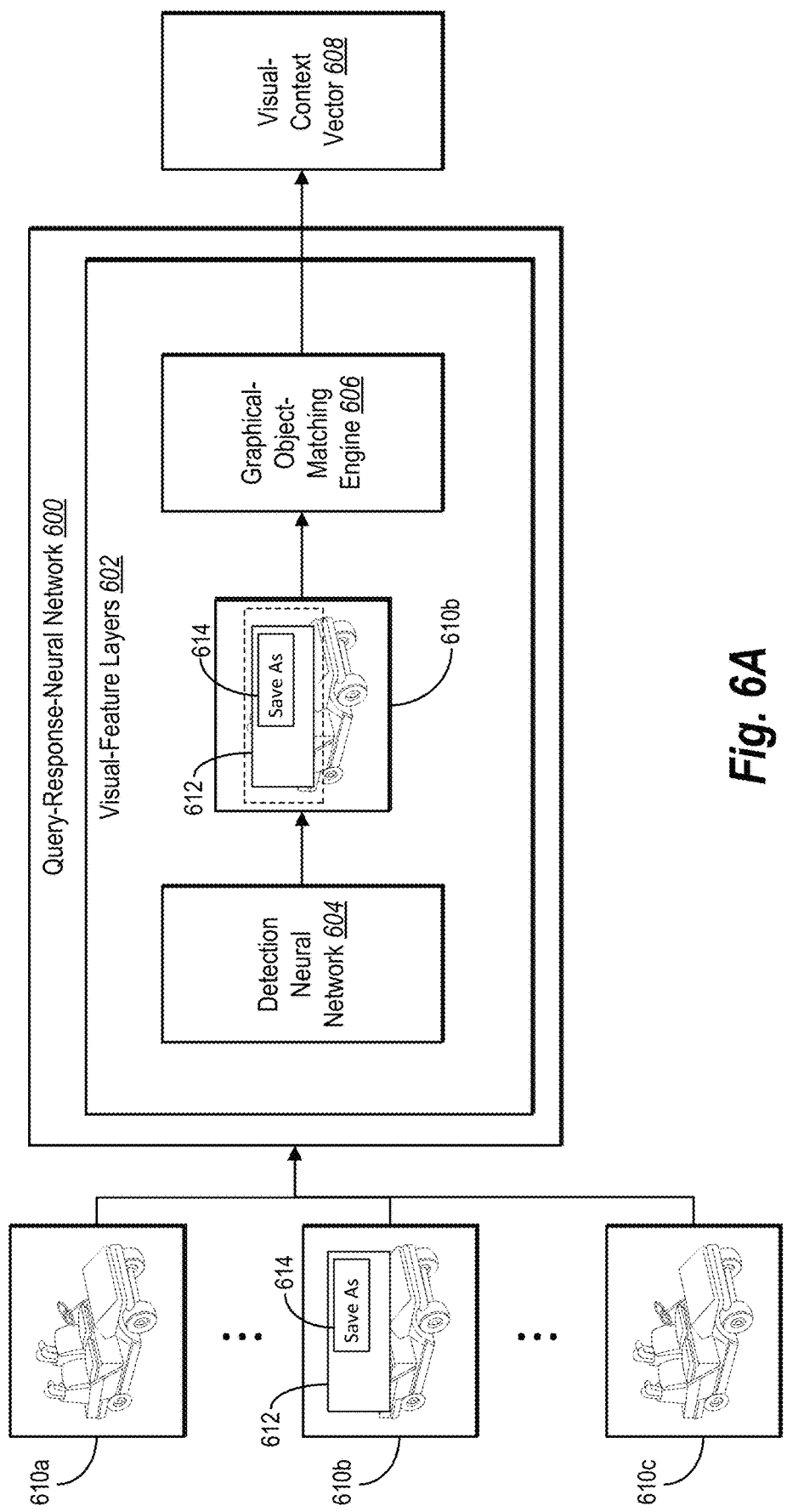
FIG. 6A illustrates a query-response-neural network utilizing visual-feature layers to generate a context vector in accordance with one or more embodiments.

As mentioned above, the query-response system 106 utilizes context-network layers, including visual-feature layers for generating visual-context vectors, thereby improving responses to user questions regarding a video by accounting for multiple contextual modalities. FIG. 6A illustrates the query-response system 106 utilizing visual-feature layers 602 that comprises a detection neural network 604 and a graphical-object-matching engine 606 for generating a visual-context vector 608 in accordance with one or more embodiments of the present disclosure. As shown, a query-response-neural network 600 of the query-response system 106 can pass one or more video frames 610a-610c of a video segment to the visual-feature layers 602. In so doing, the visual-feature layers 602 can detect one or more visual features representing visual objects or categories by using the detection neural network 604. Such visual features may represent a pop-up dialogue 612 depicted in the video frame 610b. Then, using the pop-up dialogue 612 in the video frame 610b and the graphical-object-matching engine 606, the visual-feature layers 602 can further recognize one or more objects within a detected object, such as by detecting an object 614 (e.g., a 'save as' element) from the pop-up dialogue 612 to correspondingly output the visual-context vector 608.

In more detail, in some embodiments, the detection neural network 604 comprises one or more neural networks, such as a convolutional neural network. For instance, the detection neural network 604 can use a single convolutional neural network that can simultaneously predicts multiple bounding boxes and class probabilities for such bounding boxes in a unified detection approach and thereby quickly identify objects within an image (as described in Joseph Redmon, Santosh Divvala, Ross Girshick, and Ali Farhadi, *You Only Look Once: Unified, Real-Time Object Detection*, In Proceedings of the IEEE CVPR, 2016, pages 779-788, hereby incorporated by reference in its entirety) (hereafter, "Redmon et al."). Accordingly, when the visual-feature layers 602 pass at least the video frame 610b to the detection neural network 604, the detection neural network 604 can detect or otherwise identify the pop-up dialogue 612 as indicated by the encompassing dotted lines within the video frame 610b. In turn, the visual-feature layers 602 can analyze objects (e.g., the object 614) within the pop-up dialogue 612 by using the graphical-object-matching engine 606. Specifically, the graphical-object-matching engine 606 can extract textual-feature embeddings from objects within the detected pop-up dialogues or panels, such as textual-feature embeddings from the object 614 within the pop-up dialogue 612. Based on the extracted textual-feature embeddings, the graphical-object-matching engine 606 can output the visual-context vector 608. The visual-context vector 608 indicates a particular detected object corresponding to a category (e.g., a particular type of pop-up dialogue or panel).

Figure 6B:
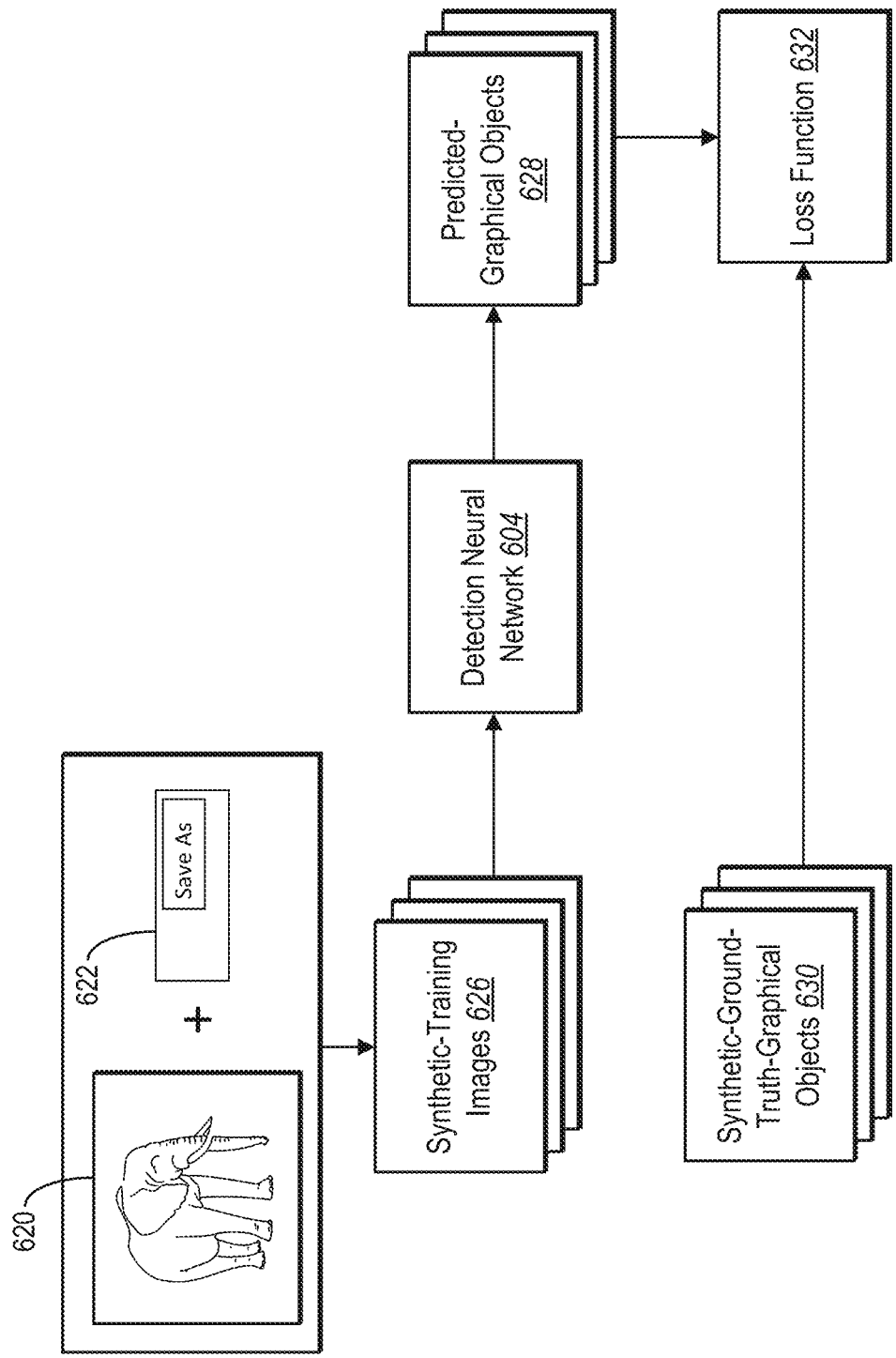
FIG. 6B illustrates a query-response system training a detection neural network to detect graphical objects in accordance with one or more embodiments.

As mentioned above in relation to FIG. 6A, the query-response system 106 can utilize the detection neural network 604 to detect visual features within video frames of a video segment. FIG. 6B illustrates the query-response system 106 training the detection neural network 604 to detect visual features in accordance with one or more embodiments of the present disclosure. Although shown as a single training cycle, the query-response system 106 may perform the training acts and/or algorithms of FIG. 6B in an iterative manner, for example, until a point of convergence. As shown, the query-response system 106 generates synthetic-training images 626 based on various combinations of a background image 620 (e.g., a random background image) and a graphical object 622 (e.g., a software-user-interface component). Each such synthetic-training image can include an object superimposed on a background image. In some embodiments, the query-response system 106 utilizes objects from the external domain knowledge (e.g., the knowledge base 430 of FIG. 4) as a graphical object for generating the synthetic-training images 626.

Then, upon inputting the synthetic-training images 626 to the detection neural network 604, the detection neural network 604 can generate predicted-graphical objects 628. Specifically, for each one of the synthetic-training images 626, the detection neural network 604 can output one or more predicted-graphical objects 628. In some embodiments, the predicted-graphical objects 628 each comprise a bounding box sized and shaped to coincide with positional coordinates of a predicted presence of a graphical object within the synthetic-training image. That is, in some embodiments, the detection neural network 604 outputs the predicted-graphical objects 628 in the form of a bounding box indicating an area in the synthetic-training image where the detection neural network 604 predicts that some graphical object exists (e.g., a software-user-interface component). Thus, in some embodiments, synthetic-ground-truth-graphical objects 630 can include, for any visual features, one or more of the following physically defining a graphical object: (i) actual positional coordinates within the synthetic-training image, (ii) relevant cells or pixels are associated with a graphical object, (iii) a written description of the graphical object, and so forth. In turn, the query-response system 106 can compare the predicted-graphical objects 628 and the synthetic-ground-truth-graphical objects 630 via a loss function 632 to determine a loss.

In these or other embodiments, the loss function 632 can include, but is not limited to, a regression loss function (e.g., a mean square error function, a quadratic loss function, an L2 loss function, a mean absolute error/L1 loss function, mean bias error). Additionally, or alternatively, the loss function 632 can include a classification loss function (e.g., a hinge loss/multi-class SVM loss function, cross entropy loss/negative log likelihood function). Further, the loss function 632 can return quantifiable data regarding the difference between the synthetic-ground-truth-graphical objects 630 and the predicted-graphical objects 628. In particular, the loss function 632 can return such loss data to the query-response system 106 based upon which the query-response system 106 can adjust various parameters/hyperparameters to improve the quality/accuracy of predicted-visual-feature probabilities in subsequent training iterations—by narrowing the difference between the predicted-graphical objects 628 and the synthetic-ground-truth-graphical objects 630. In some embodiments, the loss function 632 can include an Adam optimizer for intelligently adjusting weights and various parameters/hyperparameters within the detection neural network 604. Moreover, the training of the detection neural network 604 can be an iterative process such that the query-response system 106 can continually adjust parameters/hyperparameters of the detection neural network 604 over training iterations.

Based on training the detection neural network 604 as just described, the visual-feature layers 602 can detect the presence of graphical objects within a video frame. This facilitates further analysis of the detected visual features as described in more detail below with respect to FIG. 6C. Additionally or alternatively to the training acts just described, the query-response system 106 may implement one or more of the acts and algorithms for training the detection neural network 604 as described in more detail in Redmon et al. For example, the query-response system 106 may pre-train convolutional layers of the detection neural network 604 on the ImageNet 1000-class competition dataset, in addition to pre-training an average-pooling layer and a fully connected layer of the detection neural network 604 using the ImageNet 2012 validation set. Based on the training of the detection neural network 604 as disclosed herein, experimental results of the detection neural network 604 shown in Table 1 indicate improved detection accuracy over conventional models trained with manually labeled images.

TABLE 1

|  | Size | Precision | Recall | F1 |
|---|---|---|---|---|
| Conventional models (manual labeling) | 1.9k | 0.738 | 0.834 | 0.783 |
| Detection Neural Network (synthesized images) | 10k | 0.923 | 0.939 | 0.930 |

As shown in Table 1, the experimental results indicate conventional models trained on manual labeling of almost two thousand images correspond to a precision score of 0.738, a recall score of 0.834, and an F1 score of 0.783. As further shown in Table 1, the experimental results indicate the detection neural network 604 trained on ten thousand synthesized images corresponds to a precision score of 0.923, a recall score of 0.939, and an F1 score of 0.930. In these results, the recall score is calculated based on the ratio of true positives ("tp") and false negatives ("fn") as follows: Recall=tp/(tp+fn). Similarly, the precision score is calculated as follows: precision=tp/(tp+fp), where "fp" represents false positives. Further, the F1 score is calculated as a weighted average of the precision score and the recall score. The foregoing scores range from zero to one, where one is the best value possible. Accordingly, a detection neural network as disclosed herein indicates an 18.5%, 10.5%, and 14.7% respective increase in the precision score, recall score, and F1 score relative to conventional models.

Figure 6C:
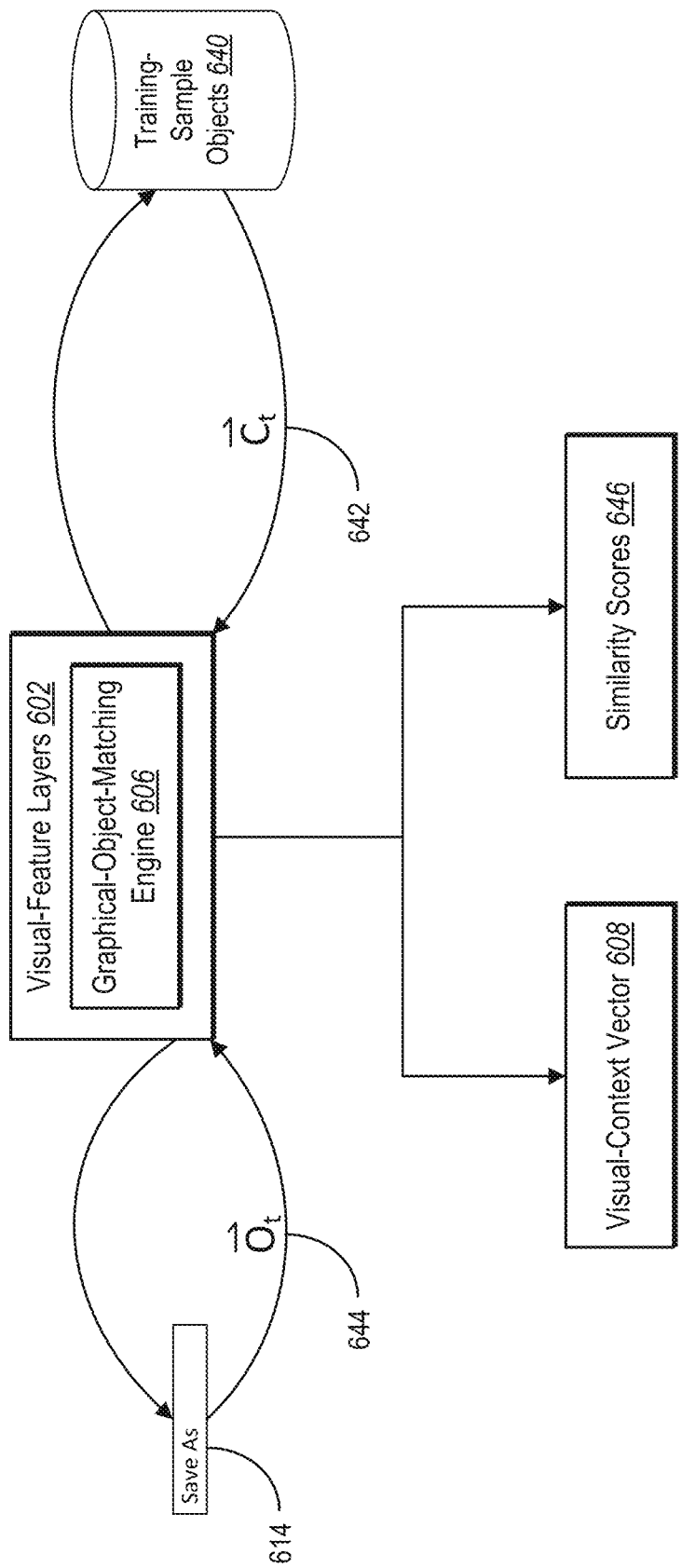
FIG. 6C illustrates a schematic diagram of visual-feature layers generating similarity scores and a visual-context vector in accordance with one or more embodiments.

As mentioned above, the visual-feature layers 602 can utilize the graphical-object-matching engine 606 to further analyze detected visual features, for example, to extract textual-feature embeddings from detected objects represented by visual features of a video frame to generate a visual-context vector. In accordance with one or more embodiments of the present disclosure, FIG. 6C illustrates a schematic diagram of the graphical-object-matching engine 606 comparing extracted textual-feature embeddings 644 from the object 614 with training-sample-textual-feature embeddings 642 and generating the visual-context vector 608 based on similarity scores 646.

To extract the textual-feature embeddings 644 from the object 614, for example, the graphical-object-matching engine 606 can use one or more word-vector-representation models, as described above in relation to the foregoing figures. Additionally or alternatively, the graphical-object-matching engine 606 can perform an optical character recognition process to convert image data of the detected pop-up dialogue 612 (or just the object 614) to textual data. Based on the textual data, the graphical-object-matching engine 606 can utilize a bag-of-words approach to generate the textual-feature embeddings 644. For example, according to one or more bag-of-words models, the graphical-object-matching engine 606 may implement a count-occurrence approach, a normalized count occurrence approach, and/or a term frequency-inverse document frequency approach to generate the textual-feature embeddings 644. In a same or similar manner (e.g., using a word-vector-representation model), the graphical-object-matching engine 606 can extract or otherwise generate the training-sample-textual-feature embeddings 642 from training-sample objects 640. In these or other embodiments, the training-sample objects 640 are associated with or otherwise representative of particular visual-feature categories (e.g., specific types of objects such as a save-as dialogue, a color-editing panel, etc.).

In turn, the graphical-object-matching engine 606 can compare the textual-feature embeddings 644 with the training-sample-textual-feature embeddings 642 to generate the similarity scores 646. To do so, the graphical-object-matching engine 606 utilizes a visual-feature-matching algorithm. In some embodiments, the graphical-object-matching engine 606 can execute the visual-feature-matching algorithm according to the following example expression:

```
1: Initialization: sim_1 = 0, for i = 1...M
2: for i = 1...M do
3:    min = ∞
4:    for j = 1...N do
5:       if dist(M_test^i, M_train^j) < min:
6:          min = dist(M_test^i, M_train^j)
7:    end for
8:    sim_i = 1/min · freq(M_test^i)
9: end for
10. similarity = Σ_{i=1}^M sim_i
```

The terms used in this example expression have the following representations: $sim_i$ represents the similarity between the i-th word in the training-sample object with the closest word in the test object (e.g., the object 614) of the detected visual feature; M and N represent the number of words detected in the test object and the training-sample object, respectively; dist(•,•) represents the distance (e.g., Euclidean distance) between two vectors; $freq(M_{test}^i)$ represents the frequency of the i-th word in the test object; and similarity represents a similarity score between one of the textual-feature embeddings 644 and one of the training-sample-textual-feature embeddings 642.

In more detail, the graphical-object-matching engine 606 utilizes the visual-feature-matching algorithm to (i) determine a closest distance in vector space between the textual-feature embeddings 644 and each of the training-sample-textual-feature embeddings 642, (ii) generate a corresponding weighted similarity score that accounts for the distance-differential between vectors and a frequency of word occurrence in the test object (where less frequent words are more important and therefore weighted more than frequently-occurring words), and (iii) aggregate the weighted similarity scores to determine respective similarity scores. Accordingly, the graphical-object-matching engine 606 can generate a similarity score for each pairing of the textual-feature embeddings 644 with a respective training-sample-textual-feature embedding 642, thereby producing the similarity scores 646.

Based on the similarity scores 646, the graphical-object-matching engine 606 can generate the visual-context vector 608 indicating a particular visual-feature category for the object 614 and the corresponding pop-up dialogue 612. That is, the graphical-object-matching engine 606 may determine that a similarity score between the textual-feature embeddings 644 and at least one of the training-sample-textual-feature embeddings 642 is a highest similarity score or a similarity score satisfying a threshold similarity score. Such a similarity score may thus indicate that the object 614 corresponds to a same or similar visual-feature category as that associated with the at least one training-sample-textual-feature embedding. Accordingly, in some embodiments, the visual-context vector 608 comprises a one-hot vector of 1×n-dimensions, in which the non-zero value in the one-hot vector corresponds to the visual-feature category for the object 614 and associated pop-up dialogue 612.

Figure 7:
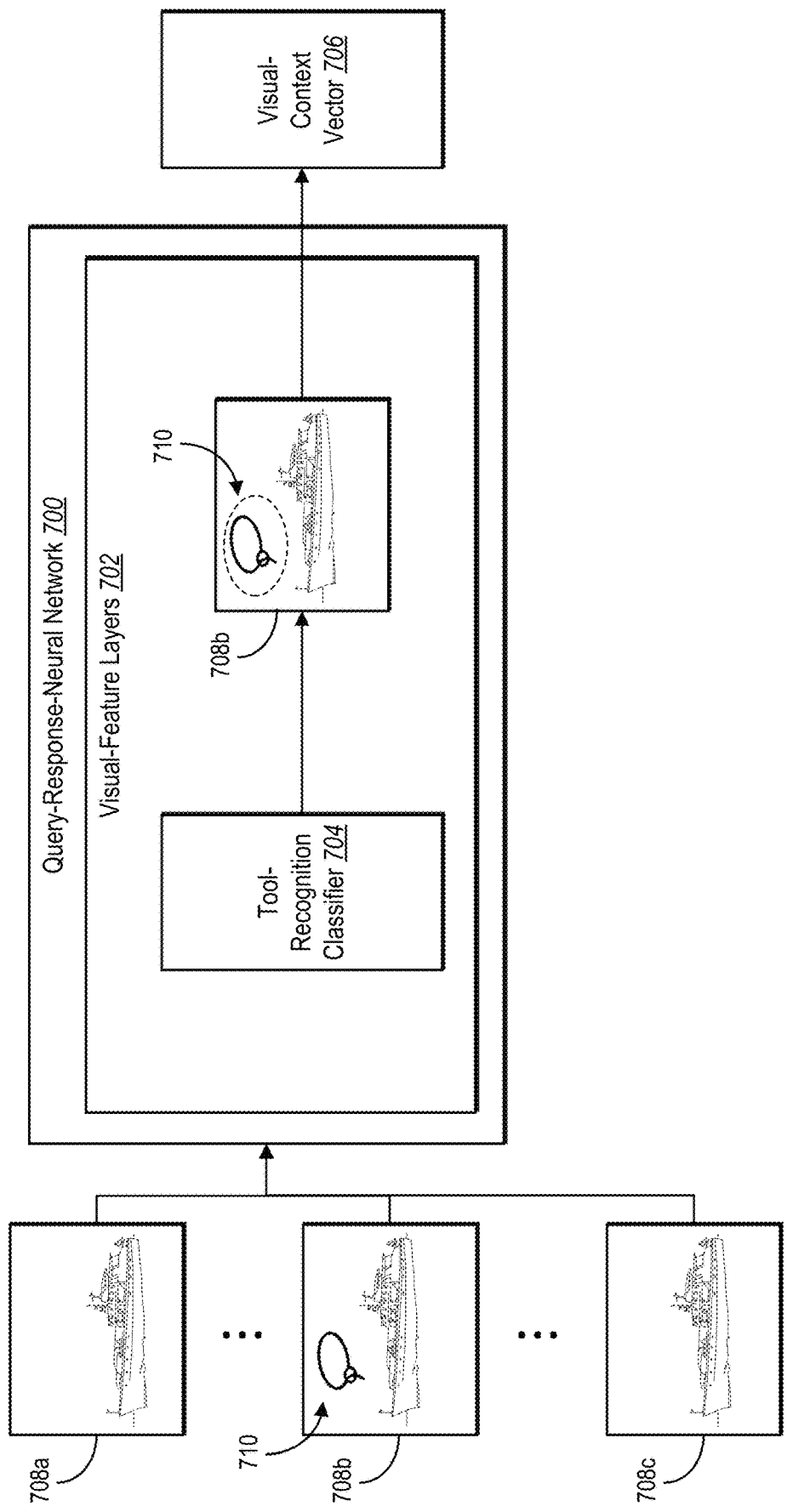
FIG. 7 illustrates a query-response-neural network utilizing visual-feature layers to generate a context vector in accordance with one or more embodiments.

As just described, the query-response system 106 can detect and recognize various visual features by utilizing a detection neural network and a graphical-object-matching engine. In some embodiments, the query-response system 106 utilizes additional or alternative elements within visual-feature layers of a query-response-neural network to recognize certain visual features, such as tools (e.g., a lasso tool, selection tool, crop tool, brush tool, move tool, zoom tool, etc.). In accordance with one or more embodiments of the present disclosure, FIG. 7 illustrates the query-response-neural network 302 utilizing visual-feature layers 702 comprising a tool-recognition classifier 704 for generating a visual-context vector 706. As shown, a query-response-neural network 700 of the query-response system 106 passes one or more video frames 708a-708c to the visual-feature layers 702. In so doing, the visual-feature layers 702 can recognize one or more visual features, specifically a software-user-interface tool 710, depicted in the video frame 708b by using the tool-recognition classifier 704. In turn, the tool-recognition classifier 704 can output the visual-context vector 706 based on the recognized software-user-interface tool 710.

In more detail, the tool-recognition classifier 704 comprises one or more image recognition models. For example, in some embodiments, the tool-recognition classifier 704 recognizes various tools using a residual learning framework (as described in Kaiming He, Xiangyu Zhang, Shaoqing Ren, Jian Sun, *Deep Residual Learning For Image Recognition*, In Proceedings of the IEEE CVPR, 2016, pages 770-778, hereby incorporated by reference in its entirety). Accordingly, when the visual-feature layers 702 pass at least the video frame 708b of the video frames 708a-708c to the tool-recognition classifier 704, the tool-recognition classifier 704 can recognize the software-user-interface tool 710 as indicated by the encompassing dotted lines within the video frame 708b. In turn, the tool-recognition classifier 704 can output the visual-context vector 706, for example, in the form of a one-hot vector corresponding to the particular tool as recognized in the video segment. For the video frames 708a and 708c, the tool-recognition classifier 704 may determine that no software-user-interface tools are detectable in the video frames. In turn, the tool-recognition classifier 704 may output a vector of zeros as visual-context vectors corresponding to the video frames 708a and 708c. Alternatively, the query-response-neural network 700 may select the video frames 708a and 708c (without detectable software-user-interface tools) to be cached (e.g., temporarily), disregarded, tagged for deletion, etc.

Figure 8A:
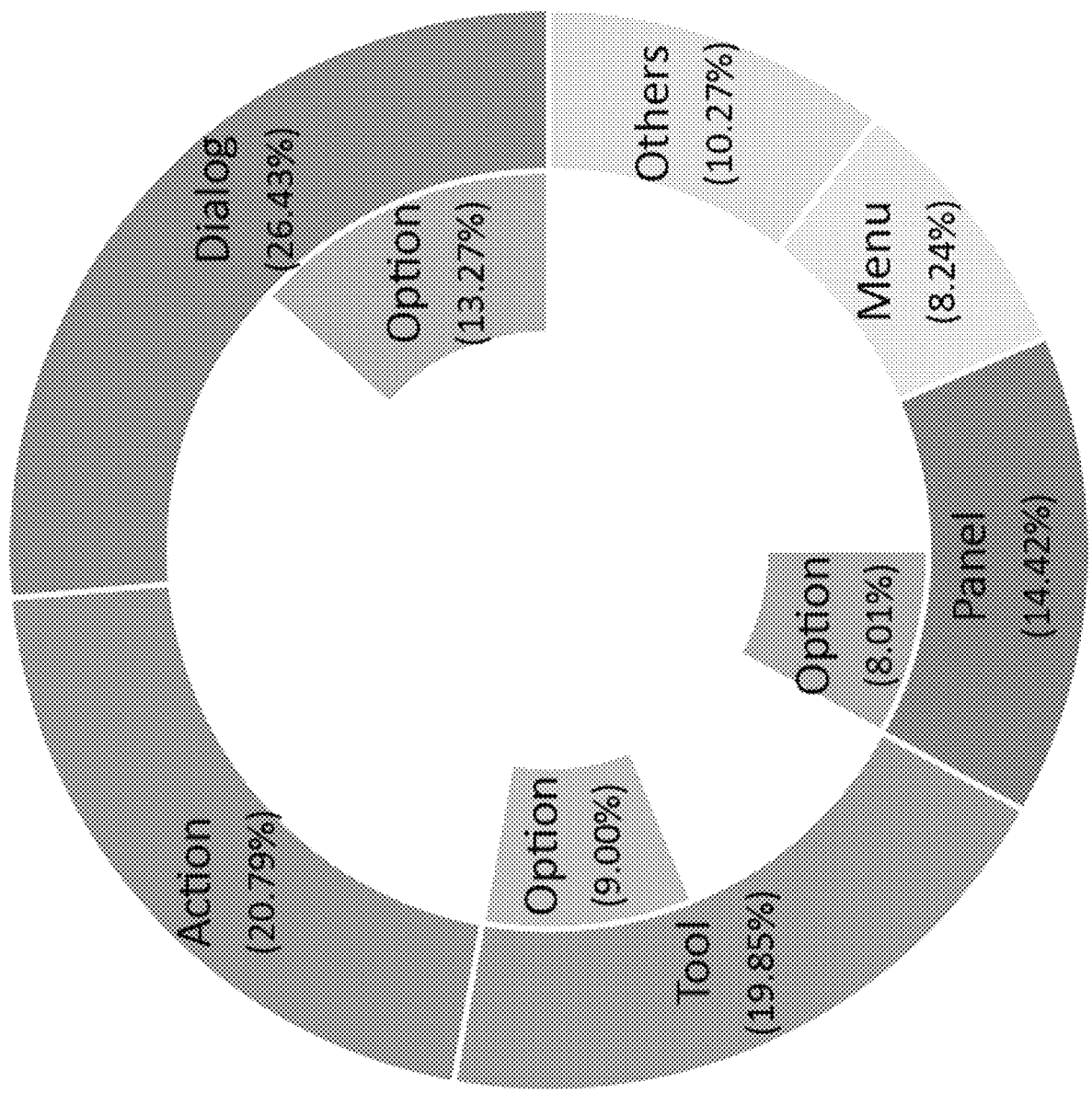
FIGS. 8A-8B illustrate experimental results for respective elements of responses and questions relating to a video segment in accordance with one or more embodiments.
Figure 8B:
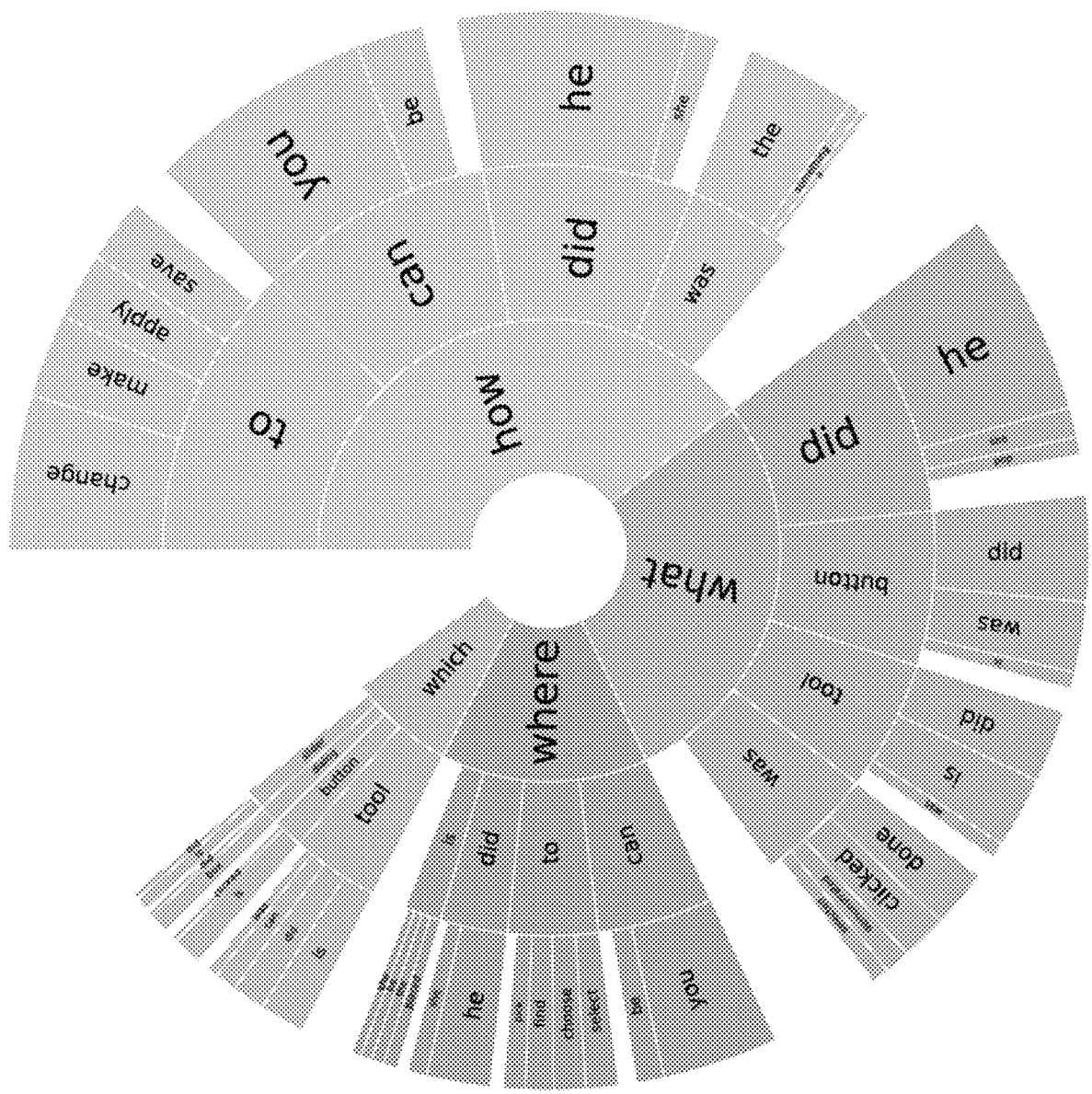

As mentioned above, the query-response system 106 can utilize an external domain knowledge base to transfer information to candidate responses, thereby improving responses to user questions. To build the external domain knowledge base, experimental results are considered to improve the quality of candidate responses. FIGS. 8A-8B illustrate experimental results for respective elements of responses and questions relating to a video segment in accordance with one or more embodiments of the present disclosure. In particular, FIG. 8A shows an example response distribution relative to objects of constructed instance triples (e.g., <q, a, c> corresponding to a pairing of question, response, and video context). Approximately 70% of the responses correspond to objects (e.g., entities) linked to the external domain knowledge base. The objects linked to the external domain knowledge base include software-user-interface tools, panels, dialogs, and menus, and approximately 30% of the responses corresponding to these linked objects relate to detailed options thereof.

Further, experimental data indicates that when simply matching responses to surrounding transcript text (e.g., as done in conventional text-question answering models), only about 43% of the constructed instance triples include exact mentions of the response within five sentences before and/or after the received question. The query-response system 106 addresses this challenge by utilizing a different approach accounting for additional context from visual features and the external domain knowledge base.

FIG. 8B illustrates a distribution of trigram prefixes of user questions. As shown in the distribution of trigram prefixes, most questions correspond to events or visual aspects (e.g., detected graphical objects as described in FIGS. 6A-6C and FIG. 7) presented during a video segment. In one of the trigrams, questions begin with "how to," "how can," "how did," or "how was." In another of the trigrams, questions begin with "what was," "what tool," "what button," or "what did." In the other trigram, questions begin with "where" or "which," (e.g., "where can," "where to," "where did," "where is," "which tool," "which button," "which dialogue," or "which slider").

Figures 9A, 9B:
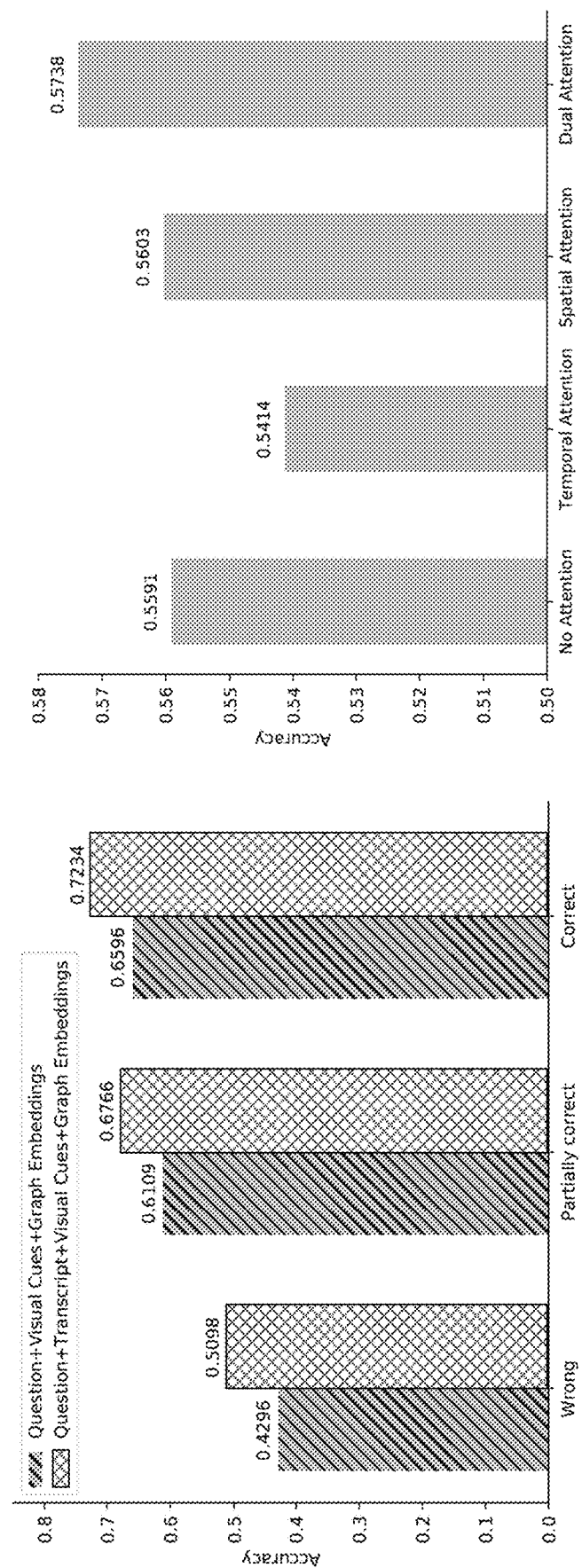
FIGS. 9A-9B illustrate experimental results of response accuracy for a query-response system in accordance with one or more embodiments of the present disclosure.

As described throughout the present disclosure, the query-response system 106 can provide improved responses to user questions. In accordance with one or more embodiments of the present disclosure, FIGS. 9A-9B illustrate experimental results of response accuracy for responses provided by various embodiments of the query-response system 106. In particular, FIG. 9A shows experimental results of two particular embodiments of the query-response system 106 on three subsets of a test dataset divided by the degree of prediction errors from the visual-feature layers disclosed herein. The two embodiments illustrated in FIG. 9A vary only in that one embodiment does not account for textual context (e.g., the transcript for the video segment), while both embodiments account for the question, visual features, and graph embeddings. As mentioned above, graph embeddings are vector representations of portions of a graph structure linking candidate responses and visual features of the external domain knowledge. Accordingly, the query-response system 106 accounting for multiple-contextual modalities of both visual context and textual context leads to improved response accuracy in all three subsets of the test dataset. Specifically, the experimental results in FIG. 9A indicate accuracy gains of 8%, 6.6%, and 6.4% for the respective datasets when accounting for multiple-contextual modalities of both visual context and textual context as opposed to just visual context.

In addition to the experimental results of FIG. 9A, Table 2 provides additional experimental data, which also confirms the improved accuracy from utilizing multiple contextual modalities. Accordingly, in addition to utilizing the external domain knowledge base via graph embeddings for fine-tuning candidate-response vectors as described in relation to the foregoing figures, the query-response system 106 further improves the accuracy of selecting a response to a question corresponding to a video segment by accounting for both visual features and transcript text. In particular, Table 2 compares the performances of various embodiments of the query-response system 106 with the following metrics: mean reciprocal rank (MRR), recall score at the k-th iteration (defined above in relation to Table 1 and denoted here as "R@k"), and the average rank of the ground truth response (denoted as "Avg Rank"), where the higher MRR and R@k scores indicate better responses than lower MRR and R@k scores. As shown from the comparison, the experimental results in Table 2 indicate the best performance gains (in bolded font) for the embodiment disclosed herein accounting for multiple-contextual modalities of both visual context ("Visual Cues") and textual context ("Question" and "Transcript") in view of the external domain knowledge base captured in "Graph Embedding[s]."

TABLE 2

| Question | Transcript | Visual Cues | Graph Embedding | MRR | R@1 | R@5 | R@10 | Avg Rank |
|---|---|---|---|---|---|---|---|---|
| ✓ | | | | 0.4611 | 0.3460 | 0.6030 | 0.6793 | 48.12 |
| ✓ | ✓ | | | 0.5610 | 0.4494 | 0.6890 | 0.7527 | 61.16 |
| ✓ | | ✓ | | 0.5445 | 0.4270 | 0.6768 | 0.7527 | 68.01 |
| ✓ | ✓ | ✓ | | 0.5640 | 0.4582 | 0.6903 | 0.7688 | 38.16 |
| ✓ | | | ✓ | 0.5000 | 0.3802 | 0.6451 | 0.7316 | 22.76 |
| ✓ | ✓ | | ✓ | 0.5832 | 0.4806 | 0.6992 | 0.7764 | 18.75 |
| ✓ | | ✓ | ✓ | 0.5886 | 0.4831 | 0.7051 | 0.7726 | 21.77 |
| ✓ | ✓ | ✓ | ✓ | 0.6637 | 0.5591 | 0.7869 | 0.8439 | 19.27 |
| ✓ | ✓ | ResNet | ✓ | 0.5027 | 0.4013 | 0.6139 | 0.6937 | 24.60 |

FIG. 9B illustrates the performance comparison the query-response system 106 utilizing no attention mechanism, a spatial-attention mechanism, a temporal-attention mechanism, and dual attention (e.g., both the spatial-attention mechanism and the temporal-attention mechanism) as described in relation to the foregoing figures. In particular, the experimental results of FIG. 9B show that the query-response system 106 utilizing dual attention provides a 1.5% increase in response accuracy relative to an embodiment of the query-response system 106 with no attention, over a 3% increase in response accuracy relative to just utilizing the temporal-attention mechanism, and a 1.4% increase in response accuracy relative to just utilizing the spatial-attention mechanism. Accordingly, as shown in FIG. 9B, one of the embodiments disclosed herein utilizing dual attention generates the best accuracy results.

Figure 10:
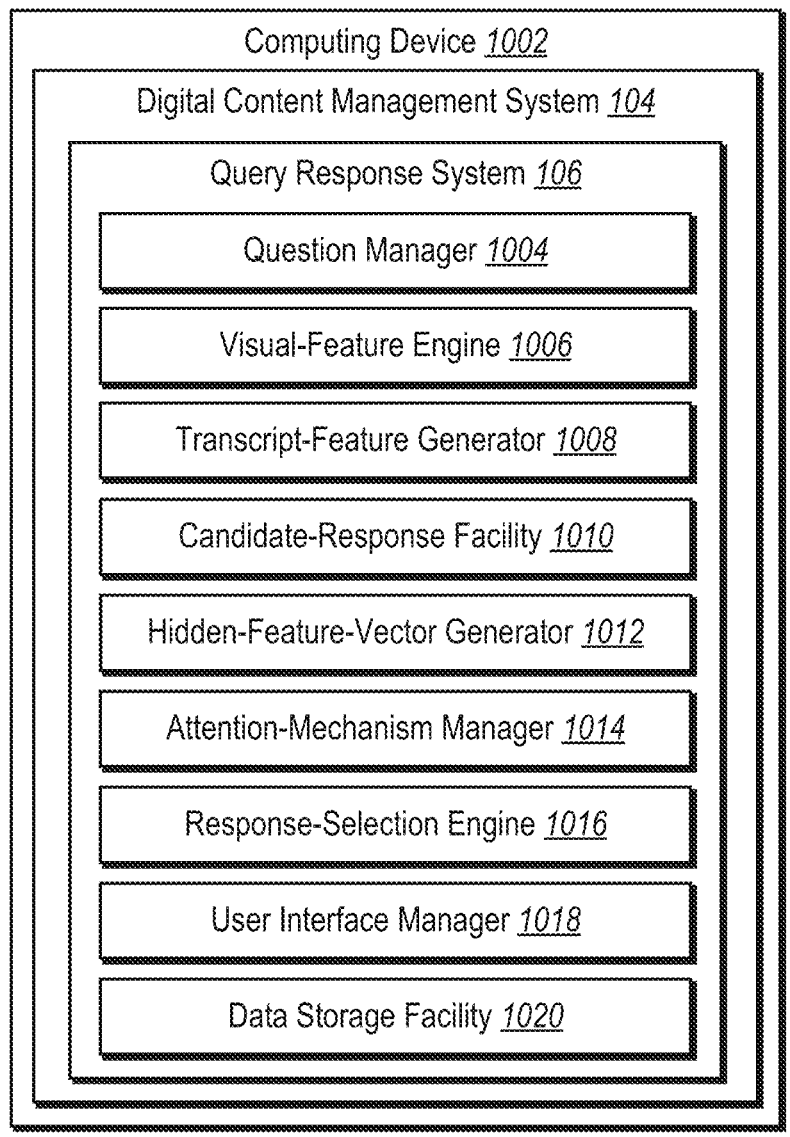
FIG. 10 illustrates an example schematic diagram of a query-response system in accordance with one or more embodiments.

Turning to FIG. 10, additional detail will now be provided regarding various components and capabilities of the query-response system 106. In particular, FIG. 10 illustrates an example schematic diagram of the query-response system 106 implemented by a computing device 1002 in accordance with one or more embodiments of the present disclosure. As shown, the query-response system 106 is further implemented by the computing device 1002 and the digital content management system 104. Also illustrated, the query-response system 106 can include a question manager 1004, a visual-feature engine 1006, a transcript-feature generator 1008, a candidate-response facility 1010, a hidden-feature-vector generator 1012, an attention-mechanism manager 1014, a response-selection engine 1016, a user interface manager 1018, and a data storage facility 1020.

The question manager 1004 can obtain, send, receive, process, transform, convert, and/or analyze questions corresponding to video segments as described in relation to the foregoing figures. For example, the question manager 1004 can receive a question from a user during display or playback of a video. Additionally, in some embodiments, the question manager 1004 can sort and/or perform pre-processing of portions of the received questions. In particular, the question manager 1004 can generate query vectors based on the received questions as described in relation to the foregoing figures.

The visual-feature engine 1006 can obtain, send, receive, process, transform, convert, and/or analyze video data corresponding to a video segment as described in relation to the foregoing figures. For example, the visual-feature engine 1006 can analyze image data according to video frames and/or timesteps. In particular, the visual-feature engine 1006 can, based on the analyzed image data, generate visual-context vectors representing visual features corresponding to the video segment (e.g., via detection and recognition acts and algorithms disclosed herein). As further part of the visual-feature engine 1006, the visual-feature engine 1006 can train, teach, and/or learn machine learning models, such as the detection neural network 604 and the tool-recognition classifier 704 that, when applied to video segments, detect visual features for generating visual-context vectors.

The transcript-feature generator 1008 can obtain, send, receive, process, transform, convert, and/or analyze transcript text corresponding to a video segment as described in relation to the foregoing figures. For example, the transcript-feature generator 1008 can analyze textual data according to available transcript data. In some implementations, the transcript-feature generator 1008 can generate transcript data corresponding to the video segment if not already available (e.g., via a speech-to-text mechanism). Based on the analyzed textual data, the transcript-feature generator 1008 can generate textual-context vectors representing the transcript text corresponding to the video segment.

The candidate-response facility 1010 can obtain, send, receive, process, and/or analyze candidate responses in view of an external domain knowledge base as described in relation to the foregoing figures. In particular, the candidate-response facility 1010 can transfer knowledge from the external domain knowledge base to the candidate responses. For example, the candidate-response facility 1010 can generate candidate-response vectors and fine-tune them using the external domain knowledge base.

The hidden-feature-vector generator 1012 can obtain, send, receive, process, transform, convert, weight, and/or analyze vector inputs at a recurrent neural network to generate one or more hidden-feature vectors as described in relation to the foregoing figures. In particular, the hidden-feature-vector generator 1012 can learn and/or apply temporal, spatial, or other dynamics of various inputs vectors at the recurrent neural network. For example, the hidden-feature-vector generator 1012 can generate hidden-feature vectors based on one or more context vectors and/or the query vector input at the recurrent neural network. Additionally, in some embodiments, the hidden-feature-vector generator 1012 utilizes layers in the recurrent neural network comprising one or more gated recurrent units.

The attention-mechanism manager 1014 can obtain, send, receive, process, transform, convert, weight, and/or analyze vector inputs at an attention mechanism as described in relation to the foregoing figures. In particular, the attention-mechanism manager 1014 can attend to context vectors, a query vector, etc. using a spatial-attention mechanism and/or a temporal-attention mechanism. In this manner, the attention-mechanism manager 1014 can focus the contextual modalities from one or more of the video frames in the video segment according to time, spatial positioning, etc.

The response-selection engine 1016 can obtain, send, receive, process, analyze, and/or compare vector inputs utilizing a matching function to determine a response to a user question as described in relation to the foregoing figures. In particular, the response-selection engine 1016 can compare a query-context vector with each of the candidate-response vectors and generate corresponding matching scores. Based on a matching score for a pairing of the query-context vector with a given candidate-response that satisfies a threshold matching score, the response-selection engine 1016 can select a response from the candidate responses and, in reply to the user question, present the selected response to the user.

The user interface manager 1018 can provide, manage, and/or control a graphical user interface (or simply "user interface"). In particular, the user interface manager 1018 may generate and display a user interface by way of a display screen composed of a plurality of graphical components, objects, and/or elements that allow a user to perform a function. For example, the user interface manager 1018 can receive user inputs from a user, such as a click/tap to submit a question regarding a video. Additionally, the user interface manager 1018 can present a variety of types of information, including text, digital media items, search results, product recommendations, or other information (e.g., as part of a response to the submitted question regarding the video).

The data storage facility 1020 maintains data for the query-response system 106. For example, the data storage facility 1020 (e.g., via one or more memory devices) can maintain data of any type, size, or kind, as necessary to perform the functions of the query-response system 106, including digital images, synthetic-training images, an external domain knowledge base, learned parameters, etc.

Each of the components of the computing device 1002 can include software, hardware, or both. For example, the components of the computing device 1002 can include one or more instructions stored on a computer-readable storage medium and executable by processors of one or more computing devices, such as a client device or server device. When executed by the one or more processors, the computer-executable instructions of the query-response system 106 can cause the computing device(s) (e.g., the computing device 1002, the server(s) 102) to perform the methods described herein. Alternatively, the components of the computing device 1002 can include hardware, such as a special-purpose processing device to perform a certain function or group of functions. Alternatively, the components of the computing device 1002 can include a combination of computer-executable instructions and hardware.

Furthermore, the components of the computing device 1002 may, for example, be implemented as one or more operating systems, as one or more stand-alone applications, as one or more modules of an application, as one or more plug-ins, as one or more library functions or functions that may be called by other applications, and/or as a cloud-computing model. Thus, the components of the computing device 1002 may be implemented as a stand-alone application, such as a desktop or mobile application. Furthermore, the components of the computing device 1002 may be implemented as one or more web-based applications hosted on a remote server.

The components of the computing device 1002 may also be implemented in a suite of mobile device applications or "apps." To illustrate, the components of the computing device 1002 may be implemented in an application, including but not limited to ADOBE® PHOTOSHOP, ADOBE® FLASH PLAYER, ADOBE® INDESIGN, ADOBE® PREMIER PRO, ADOBE® ILLUSTRATOR, ADOBE® XD, or ADOBE® ACROBAT DC. Product names, including "ADOBE" and any other portion of one or more of the foregoing product names, may include registered trademarks or trademarks of Adobe Inc. in the United States and/or other countries.

Figure 11:
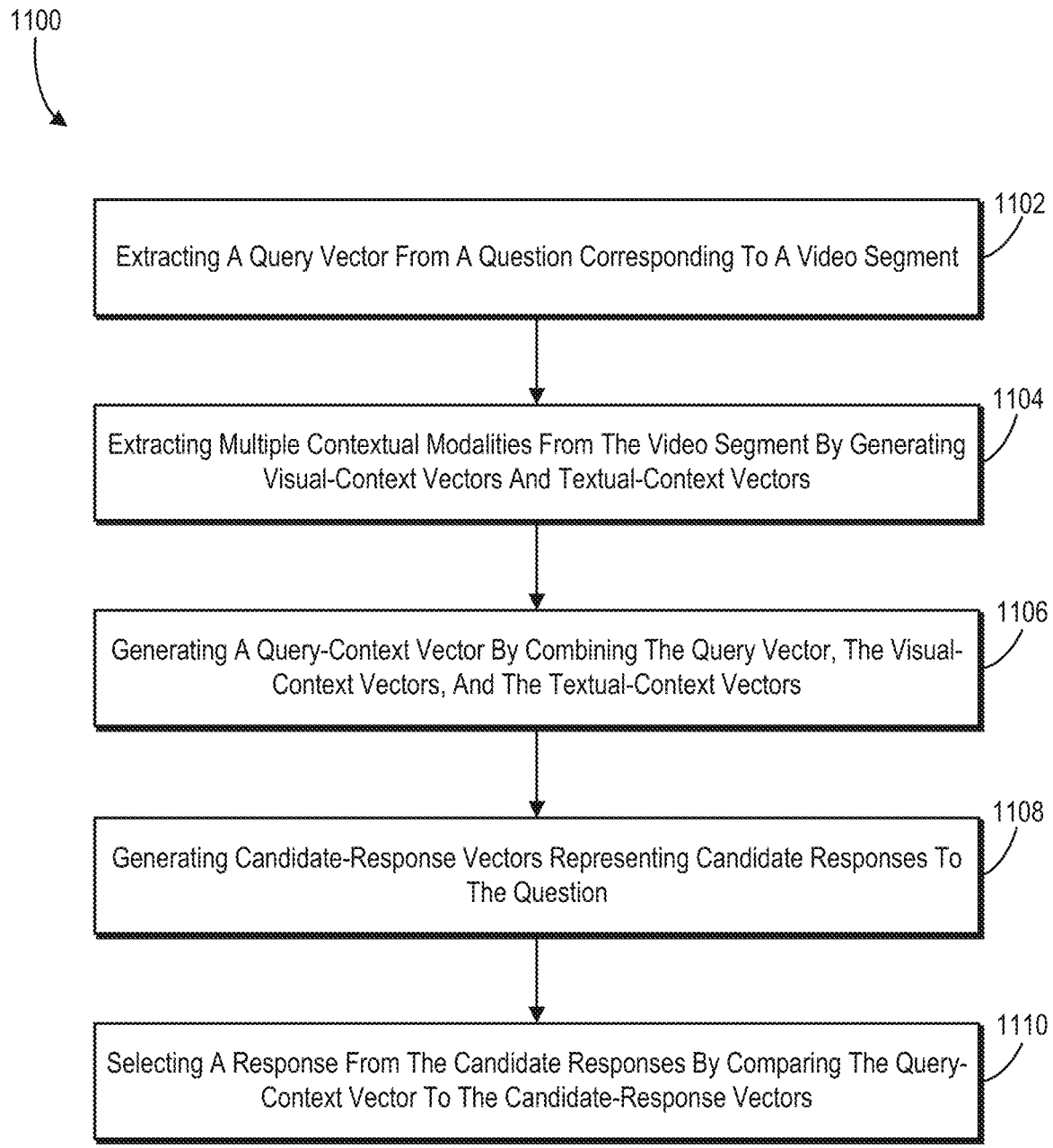
FIG. 11 illustrates a flowchart of a series of acts for determining a response to a question in accordance with one or more embodiments.

FIGS. 1-10, the corresponding text, and the examples provide several different systems, methods, techniques, components, and/or devices of the query-response system 106 in accordance with one or more embodiments. In addition to the above description, one or more embodiments can also be described in terms of flowcharts including acts for accomplishing a particular result. For example, FIG. 11 illustrates a flowchart of a series of acts 1100 for selecting a response to user question corresponding to a video segment in accordance with one or more embodiments. The query-response system 106 may perform one or more acts of the series of acts 1100 in addition to or alternatively to one or more acts described in conjunction with other figures. While FIG. 11 illustrates acts according to one embodiment, alternative embodiments may omit, add to, reorder, and/or modify any of the acts shown in FIG. 11. The acts of FIG. 11 can be performed as part of a method. Alternatively, a non-transitory computer-readable medium can comprise instructions that, when executed by one or more processors, cause a computing device to perform the acts of FIG. 11. In some embodiments, a system can perform the acts of FIG. 11.

As shown, the series of acts 1100 includes an act 1102 of extracting a query vector from a question corresponding to a video segment. The series of acts 1100 further includes an act 1104 of extracting multiple contextual modalities from the video segment by generating visual-context vectors representing visual features and textual-context vectors representing transcript text corresponding to the video segment. In some embodiments, generating the visual-context vectors comprises utilizing visual-feature layers from a query-response-neural network. Additionally, in some embodiments, generating the textual-context vectors comprises utilizing transcript layers from the query-response-neural network.

Further, in some embodiments, generating a visual-context vector of the visual-context vectors comprises (i) extracting textual-feature embeddings from inner objects that correspond to detected outer objects, (ii) generating training-sample-textual-feature embeddings representing visual-feature categories for training-sample objects visible within videos, (iii) comparing the textual-feature embeddings with the training-sample-textual-feature embeddings, and (iv) based on comparing the textual-feature embeddings with the training-sample-textual-feature embeddings, generating the visual-context vector indicating a visual-feature category from among the visual-feature categories for a textual-feature embedding from the textual-feature embeddings. In these or other embodiments, comparing the textual-feature embeddings with the training-sample-textual-feature embeddings comprises generating similarity scores indicating a similarity between particular textual-feature embeddings and particular training-sample-textual-feature embeddings.

The series of acts 1100 additionally includes an act 1106 of generating a query-context vector by combining the query vector, the visual-context vectors, and the textual-context vectors. In some embodiments, generating the query-context vector comprises utilizing posterior layers from a query-response-neural network to (i) generate a hidden-feature vector based on textual-context vectors utilizing a recurrent neural network, (ii) generate a precursor query-context vector based on the query vector and the hidden-feature vector utilizing a temporal-attention mechanism, and (iii) generate the query-context vector based on the precursor query-context vector and the visual-context vectors utilizing a spatial-attention mechanism. Thus, in some embodiments, generating the query-context vector comprises utilizing a recurrent neural network and one or more attention mechanisms from the posterior layers.

Additionally or alternatively, in some embodiments, generating the query-context vector comprises utilizing posterior layers from a query-response-neural network to (i) generate a precursor query-context vector based on a subset of the visual-context vectors for a video frame of the video segment and the query vector by utilizing a spatial-attention mechanism and (ii) generate the query-context vector based on the precursor query-context vector and a textual-context vector for the video frame from the textual-context vectors utilizing a recurrent neural network. In these or other embodiments, the recurrent neural network comprises one or more gated recurrent units.

In addition, the series of acts 1100 includes an act 1108 of generating candidate-response vectors representing candidate responses to the question. The series of acts 1100 further includes an act 1110 of selecting a response from the candidate responses by comparing the query-context vector to the candidate-response vectors. In some embodiments, selecting the response from the candidate responses comprises (i) generating a matching score for each query-response pairing between the query-context vector and a respective candidate-response vector from the candidate-response vectors and (ii) selecting the response based on a particular query-response pairing having a particular matching score satisfying a threshold matching score.

It is understood that the outlined acts in the series of acts 1100 are only provided as examples, and some of the acts may be optional, combined into fewer acts, or expanded into additional acts without detracting from the essence of the disclosed embodiments. Additionally, the acts described herein may be repeated or performed in parallel with one another or in parallel with different instances of the same or similar acts. As an example of an additional act not shown in FIG. 11, act(s) in the series of acts 1100 may include identifying the visual-feature category from among the visual-feature categories for the textual-feature embedding based on the similarity scores. In some embodiments, identifying the visual-feature category from among the visual-feature categories for the textual-feature embedding comprises identifying that the textual-feature embedding is associated with a similarity score satisfying a threshold similarity. As another example act not shown in FIG. 11, act(s) in the series of acts 1100 may include detecting objects from the video segment by utilizing a detection neural network. In yet another example act not shown in FIG. 11, act(s) in the series of acts 1100 may include (i) generating the visual-context vectors by utilizing visual-feature layers from the query-response-neural network, and (ii) generating the textual-context vectors by utilizing transcript layers from the query-response-neural network.

In addition (or in the alternative) to the acts described above, in some embodiments, the series of acts 1100 can include performing a step for combining the query vector, the visual-context vectors, and the textual context vectors from the video segment to form a query-context vector. For instance, the acts and algorithms described above in relation to FIG. 3, 4, or 5A-5C can comprise the corresponding acts (or structure) for a step for combining the query vector, the visual-context vectors, and the textual context vectors from the video segment to form a query-context vector.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 12:
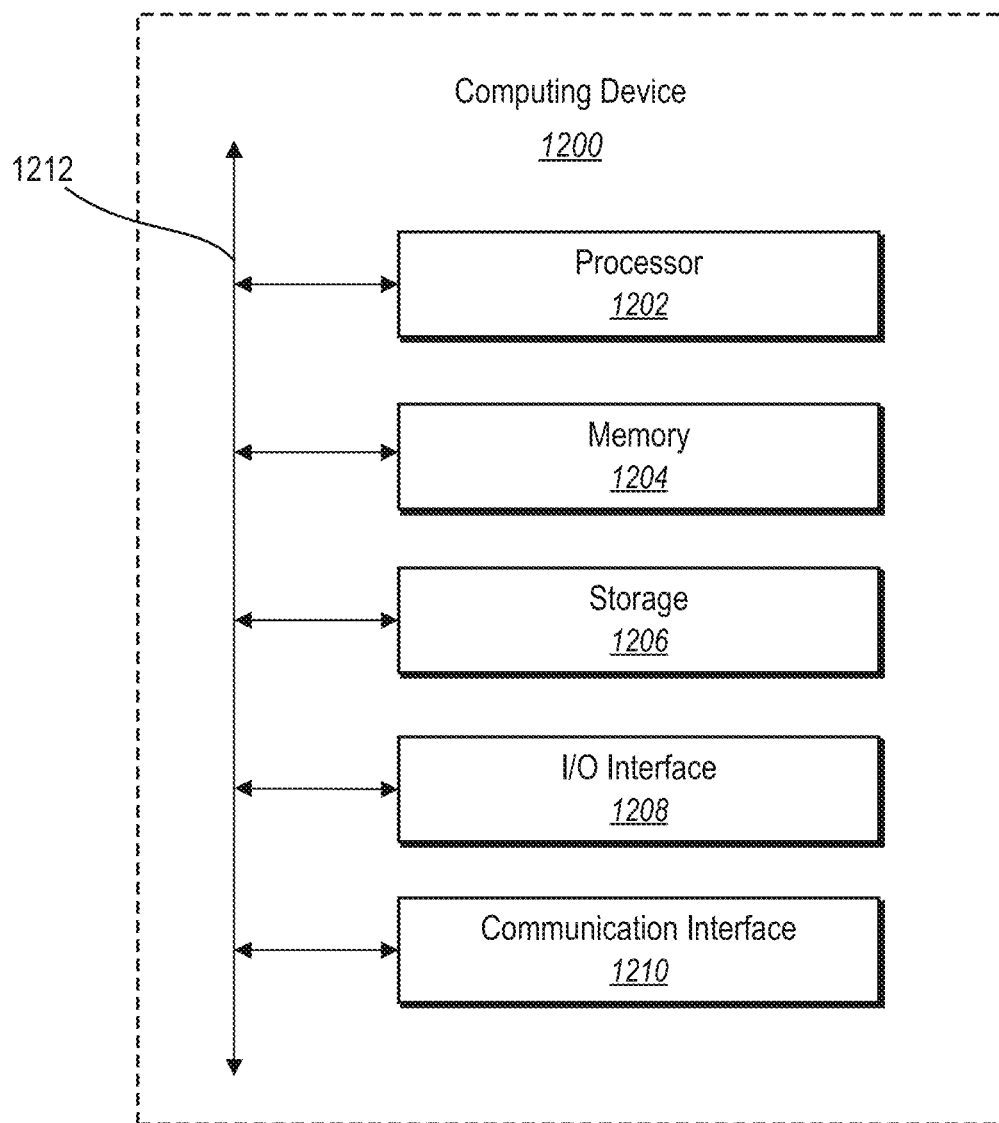
FIG. 12 illustrates a block diagram of an example computing device for implementing one or more embodiments of the present disclosure.

FIG. 12 illustrates a block diagram of an example computing device 1200 that may be configured to perform one or more of the processes described above. One will appreciate that one or more computing devices, such as the computing device 1200 may represent the computing devices described above (e.g., the computing device 1002, the server(s) 102, the third-party server 112, and/or the client device 108). In one or more embodiments, the computing device 1200 may be a mobile device (e.g., a mobile telephone, a smartphone, a PDA, a tablet, a laptop, a camera, a tracker, a watch, a wearable device, etc.). In some embodiments, the computing device 1200 may be a non-mobile device (e.g., a desktop computer or another type of client device). Further, the computing device 1200 may be a server device that includes cloud-based processing and storage capabilities.

As shown in FIG. 12, the computing device 1200 can include one or more processor(s) 1202, memory 1204, a storage device 1206, input/output interfaces 1208 (or "I/O interfaces 1208"), and a communication interface 1210, which may be communicatively coupled by way of a communication infrastructure (e.g., bus 1212). While the computing device 1200 is shown in FIG. 12, the components illustrated in FIG. 12 are not intended to be limiting. Additional or alternative components may be used in other embodiments. Furthermore, in certain embodiments, the computing device 1200 includes fewer components than those shown in FIG. 12. Components of the computing device 1200 shown in FIG. 12 will now be described in additional detail.

In particular embodiments, the processor(s) 1202 includes hardware for executing instructions, such as those making up a computer program. As an example, and not by way of limitation, to execute instructions, the processor(s) 1202 may retrieve (or fetch) the instructions from an internal register, an internal cache, memory 1204, or a storage device 1206 and decode and execute them.

The computing device 1200 includes memory 1204, which is coupled to the processor(s) 1202. The memory 1204 may be used for storing data, metadata, and programs for execution by the processor(s). The memory 1204 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1204 may be internal or distributed memory.

The computing device 1200 includes a storage device 1206 includes storage for storing data or instructions. As an example, and not by way of limitation, the storage device 1206 can include a non-transitory storage medium described above. The storage device 1206 may include a hard disk drive (HDD), flash memory, a Universal Serial Bus (USB) drive or a combination these or other storage devices.

As shown, the computing device 1200 includes one or more I/O interfaces 1208, which are provided to allow a user to provide input to (such as user strokes), receive output from, and otherwise transfer data to and from the computing device 1200. These I/O interfaces 1208 may include a mouse, keypad or a keyboard, a touch screen, camera, optical scanner, network interface, modem, other known I/O devices or a combination of such I/O interfaces 1208. The touch screen may be activated with a stylus or a finger.

The I/O interfaces 1208 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1208 are configured to provide graphical data to a display for presentation to a user. The graphical data may be representative of one or more graphical user interfaces and/or any other graphical content as may serve a particular implementation.

The computing device 1200 can further include a communication interface 1210. The communication interface 1210 can include hardware, software, or both. The communication interface 1210 provides one or more interfaces for communication (such as, for example, packet-based communication) between the computing device and one or more other computing devices or one or more networks. As an example, and not by way of limitation, communication interface 1210 may include a network interface controller (NIC) or network adapter for communicating with an Ethernet or other wire-based network or a wireless NIC (WNIC) or wireless adapter for communicating with a wireless network, such as a WI-FI. The computing device 1200 can further include a bus 1212. The bus 1212 can include hardware, software, or both that connects components of the computing device 1200 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer-readable medium comprising instructions that, when executed by at least one processor, cause the at least one processor to:
   extract a query vector from a question corresponding to a video segment;

generate one or more context vectors representing at least one of a visual feature corresponding to the video segment or transcript text corresponding to the video segment;

generate a query-context vector by combining the query vector and the one or more context vectors utilizing a neural network and one or more attention mechanisms;

generate candidate-response vectors representing candidate responses to the question; and select a response from the candidate responses by comparing the query-context vector to the candidate-response vectors.

2. The non-transitory computer-readable medium of claim 1, further comprising instructions that, when executed by the at least one processor, cause the at least one processor to generate the one or more context vectors by:

generating visual-context vectors representing visual features corresponding to the video segment; and generating textual-context vectors representing transcript text corresponding to the video segment.

3. The non-transitory computer-readable medium of claim 2, further comprising instructions that, when executed by the at least one processor, cause the at least one processor to generate the query-context vector by:

generating, utilizing a spatial attention mechanism, a precursor query-context vector based on a combination of the visual-context vectors and the query vector; and combining the precursor query-context vector and at least one of the textual-context vectors utilizing the neural network.

4. The non-transitory computer-readable medium of claim 2, further comprising instructions that, when executed by the at least one processor, cause the at least one processor to generate the query-context vector by:

generating, utilizing the neural network, hidden-feature vectors based on at least one of the textual-context vectors;

generating, utilizing a temporal attention mechanism, a precursor query-context vector based on a combination of the hidden-feature vectors and the query vector; and combining the precursor query-context vector and at least one of the visual-context vectors utilizing a spatial attention mechanism.

5. The non-transitory computer-readable medium of claim 2, further comprising instructions that, when executed by the at least one processor, cause the at least one processor to generate the query-context vector by:

generating, utilizing the neural network, hidden-feature vectors based on the visual-context vectors and the textual-context vectors; and combining the hidden-feature vectors and the query vector utilizing a temporal attention mechanism.

6. The non-transitory computer-readable medium of claim 1, further comprising instructions that, when executed by the at least one processor, cause the at least one processor to generate a visual-context vector by:

detecting, utilizing a detection neural network, an object portrayed within the video segment comprises a pop-up dialogue or panel; and extracting, utilizing a graphical-object-matching engine, a feature embedding based on textual elements inside the object.

7. The non-transitory computer-readable medium of claim 1, further comprising instructions that, when executed by the at least one processor, cause the at least one processor to generate a visual-context vector by utilizing a tool-recognition classifier to detect a software-user-interface tool.

8. A system comprising:

one or more memory devices comprising a video and dual-attention mechanisms comprising a spatial attention mechanism and a temporal attention mechanism; and one or more processors configured to cause the system to:
extract a query vector from a question corresponding to the video;

generate one or more context vectors representing at least one of a visual feature corresponding to the video or transcript text corresponding to the video;

generate a query-context vector by combining the query vector and the one or more context vectors utilizing the dual-attention mechanisms;

generate candidate-response vectors representing candidate responses to the question; and select a response from the candidate responses by comparing the query-context vector to the candidate-response vectors.

9. The system of claim 8, wherein the one or more processors are configured to cause the system to generate the one or more context vectors by:

generating visual-context vectors representing visual features corresponding to video frames of the video; and generating textual-context vectors representing transcript text corresponding to the video frames of the video.

10. The system of claim 8, wherein the one or more processors are configured to cause the system to generate the query-context vector utilizing a neural network.

11. The system of claim 8, wherein the one or more processors are configured to cause the system to generate the query-context vector by:

generating, utilizing the spatial attention mechanism, a precursor query-context vector based on a combination of visual-context vectors and the query vector; and combining the precursor query-context vector and textual-context vectors utilizing gated recurrent units (GRUs) of a recurrent neural network.

12. The system of claim 8, wherein the one or more processors are configured to cause the system to generate the query-context vector by:

generating, utilizing GRUs of a recurrent neural network, hidden-feature vectors based on textual-context vectors;

generating, utilizing the temporal attention mechanism, a precursor query-context vector based on a combination of the hidden-feature vectors and the query vector; and combining the precursor query-context vector and visual-context vectors utilizing the spatial attention mechanism.

13. The system of claim 8, wherein the one or more processors are configured to cause the system to generate the query-context vector by:

generating, utilizing GRUs of a recurrent neural network, hidden-feature vectors based on visual-context vectors and textual-context vectors; and combining the hidden-feature vectors and the query vector utilizing the temporal attention mechanism.

14. The system of claim 8, wherein the one or more processors are configured to cause the system to:

detect, utilizing a detection neural network comprising a convolutional neural network, an object portrayed within the video comprises a pop-up dialogue or a panel; and extract, utilizing a graphical-object-matching engine, a textual-feature embedding based on textual elements inside the pop-up dialogue or the panel.

15. The system of claim 14, wherein the one or more processors are configured to cause the system to:
- compare the textual-feature embedding with feature embeddings of training-sample objects by generating similarity scores indicating a similarity between the textual-feature embedding and a particular feature embedding associated with a training-sample object; and
- generate, based on the similarity scores, a visual-context vector indicating a visual-feature category for the pop-up dialogue or the panel.

16. A computer-implemented method comprising:
- extracting a query vector from a question corresponding to a video segment;
- generating visual-context vectors representing visual features corresponding to the video segment;
- generating a query-context vector by combining the query vector and the visual-context vectors utilizing a spatial attention mechanism to spatially weight one or more of the visual features corresponding to the video segment;
- generating candidate-response vectors representing candidate responses to the question; and
- selecting a response from the candidate responses by comparing the query-context vector to the candidate-response vectors.

17. The computer-implemented method of claim 16, further comprising generating textual-context vectors representing transcript text corresponding to the video segment.

18. The computer-implemented method of claim 17, wherein generating the query-context vector comprises:
- generating, utilizing the spatial attention mechanism, a precursor query-context vector based on a combination of the visual-context vectors and the query vector; and
- combining the precursor query-context vector and at least one of the textual-context vectors utilizing a neural network.

19. The computer-implemented method of claim 17, wherein generating the query-context vector comprises:
- generating, utilizing a neural network, hidden-feature vectors based on at least one of the textual-context vectors;
- generating, utilizing a temporal attention mechanism, a precursor query-context vector based on a combination of the hidden-feature vectors and the query vector; and
- combining the precursor query-context vector and at least one of the visual-context vectors utilizing the spatial attention mechanism.

20. The computer-implemented method of claim 16, further comprising:
- detecting, utilizing a detection neural network, an object portrayed within the video segment;
- extracting, utilizing a graphical-object-matching engine, a textual-feature embedding based on textual elements inside the object;
- comparing the textual-feature embedding with feature embeddings of training-sample objects by generating similarity scores indicating a similarity between the textual-feature embedding and a particular feature embedding associated with a training-sample object; and
- generating, based on the similarity scores, the visual-context vectors indicating a visual-feature category for the object.

* * * * *